(12) United States Patent
Anandakumar et al.

(10) Patent No.: US 7,626,576 B2
(45) Date of Patent: Dec. 1, 2009

(54) WIRELESS TRANSCEIVER SYSTEM FOR COMPUTER INPUT DEVICES

(75) Inventors: Krishnasamy Anandakumar, San Diego, CA (US); Martin George Morris, Vista, CA (US); Suresh Kumar Singamsetty, Carlsbad, CA (US); Dennis Ching Chung Kwan, San Diego, CA (US); Hock Thye Law, Carlsbad, CA (US)

(73) Assignee: Free Alliance Sdn Bhd, Kuala Lumpur (MY)

( * ) Notice: Subject to any disclaimer, the term of this patent is extended or adjusted under 35 U.S.C. 154(b) by 646 days.

(21) Appl. No.: 11/081,363

(22) Filed: Mar. 16, 2005

(65) Prior Publication Data

US 2005/0254647 A1 Nov. 17, 2005

Related U.S. Application Data

(60) Provisional application No. 60/553,820, filed on Mar. 16, 2004, provisional application No. 60/553,821, filed on Mar. 16, 2004, provisional application No. 60/554,058, filed on Mar. 16, 2004.

(51) Int. Cl.
G06F 3/041 (2006.01)
(52) U.S. Cl. ...................... 345/173; 345/156
(58) Field of Classification Search ......... 345/156–172; 380/255; 455/411; 713/171; 341/50
See application file for complete search history.

(56) References Cited

U.S. PATENT DOCUMENTS

| 5,392,356 | A  | * | 2/1995  | Konno et al.   | 380/249   |
|-----------|-----|---|---------|----------------|-----------|
| 6,151,355 | A  |   | 11/2000 | Vallee et al.  | 375/220   |
| 6,167,137 | A  | * | 12/2000 | Marino et al.  | 380/255   |
| 6,590,940 | B1 |   | 7/2003  | Camp, Jr. et al. | 375/297 |
| 6,595,424 | B1 |   | 7/2003  | Harrison       | 235/472.02|
| 6,621,425 | B2 | * | 9/2003  | Maeda          | 341/50    |
| 7,292,842 | B2 | * | 11/2007 | Suzuki         | 455/411   |
| 2001/0027530 | A1 |   | 10/2001 | Yen et al.     |           |
| 2002/0118735 | A1 |   | 8/2002  | Kindred        |           |
| 2003/0202619 | A1 |   | 10/2003 | Ibrahim et al. |           |
| 2004/0125787 | A1 | * | 7/2004  | May et al.     | 370/350   |
| 2004/0259529 | A1 | * | 12/2004 | Suzuki         | 455/411   |
| 2005/0005298 | A1 | * | 1/2005  | Tranchina      | 725/81    |
| 2007/0101142 | A1 | * | 5/2007  | Suzuki         | 713/171   |

OTHER PUBLICATIONS

Co-pending U.S. Patent App. JA-05-001B, U.S. Appl. No. 11/081,380, filed Mar. 16, 2005, assigned to the same assignee, High-Reliability Computer Interface for Wireless Input Devices.
Co-pending U.S. Patent App. JA-05-001D, U.S. Appl. No. 11/081,381, filed Mar. 16, 2005, assigned to the assignee, "High-Reliability Computer Interface for Wireless Input Devices".
Co-pending U.S. Patent App. JA-05-001A, U.S. Appl. No. 11/081,376, filed Mar. 16, 2005, assigned to Martin Morris et al., "High-Reliability Computer Interface for Wireless Input Devices".

(Continued)

*Primary Examiner*—Nitin Patel
(74) *Attorney, Agent, or Firm*—Saile Ackerman LLC; Stephen B. Ackerman

(57) ABSTRACT

A wireless interface device is used to RF communicate between a computer system and input devices comprising a keyboard and a mouse. The interface device comprises a radio transmitter and receiver, wherein a modem encodes data to be sent by the radio transmitter and decodes data received by the radio receiver. A baseband circuit encrypts data to be transmitted and decrypts received data. The wireless interface device has power saving functions to extend the battery life of the input device and has the capability to automatically select between several communication frequencies or channels as well as automatically select between RF data rates.

4 Claims, 22 Drawing Sheets

1100

| Preamble | Header | | | | | | | Payload | Payload CRC |
|----------|--------|---|---|---|---|---|---|---------|-------------|
|          | T | R | ACK | RSV | PL=Length | Device Indicator | Header-CRC | | |
| 16 | 1 | 1 | 1 | 1 | 7 | 3 | 8 | $0-(2^7-1)*8$ | 16 |

OTHER PUBLICATIONS

Co-pending U.S. Patent App. JA-05-002A, U.S. Appl. No. 11/082,009, filed Mar. 16, 2005, assigned to the same assignee, "Wireless Transceiver System for Computer Input Devices".

Co-pending U.S. Patent App. JA-05-002B, U.S. Appl. No. 11/082,008, filed Mar. 16, 2005, assigned to the same assigness, "Wireless Transceiver System for Computer Input Devices".

* cited by examiner

| Preamble | Header | | | | | | Payload | Payload CRC |
|---|---|---|---|---|---|---|---|---|
| | T | R | ACK | RSV | PL=Length | Device Indicator | Header-CRC | | |
| 16 | 1 | 1 | 1 | 1 | 7 | 3 | 8 | $0-(2^7-1)*8$ | 16 |

FIG. 11

WIRELESS TRANSCEIVER SYSTEM FOR COMPUTER INPUT DEVICES

This application claims priority to U.S. Provisional Patent, "High-Reliability Computer Interface for Wireless Input Device", Ser. No. 60/553,820, filed on Mar. 16, 2004, which is herein incorporated by reference in its entirety.

This application claims priority to U.S. Provisional Patent Application JAAL-002, "Wireless Transceiver System for Computer Input Devices", Ser. No. 60/553,821, filed on Mar. 16, 2004, which is herein incorporated by reference in its entirety.

This application claims priority to U.S. Provisional Patent Application JAAL-003, "Wireless Transceiver System for Computer Input Devices", Ser. No. 60/554,058, filed on Mar. 16, 2004, which is herein incorporated by reference in its entirety.

RELATED PATENT APPLICATION

This application is related to:
U.S. patent application Ser. No. 11/081,376, filed on Mar. 16, 2005,
U.S. patent application Ser. No. 11/081,380, filed on Mar. 16, 2005,
U.S. patent application Ser. No. 11/081,381, filed on Mar. 16, 2005,
U.S. patent application Ser. No. 11/082,009, filed on Mar. 16, 2005, and
U.S. patent application Ser. No. 11/082,008, filed on Mar. 16, 2005, all assigned to a common assignee.

BACKGROUND OF THE INVENTION (1) Field of the Invention

The present invention relates generally to computer systems and, more particularly, to an interface between a computer and input devices in communication with the computer over wireless links.

(2) Description of the Prior Art

Various computers and microprocessor-based devices and systems provide one or more user input devices to allow a user to control certain operations. Such an input device may be separated from the host computer or device and thus a communication link and an interface may be implemented to support proper communications between the input device and the host computer or device. Generally, each of the input device and the host computer/device includes appropriate software and hardware for the communication link and interface.

For example, a typical desk top or laptop computer may have a keyboard and a pointing device for a user to input data or commands for controlling or operating the computer. Examples of the pointing device for computers include a mouse, a touch pad, a trackball, and a pointing stick (IBM laptops). In addition to keyboards and pointing devices, examples of some other user input devices include joysticks and game pads for computers and microprocessor-based game machines, control units for other microprocessor-based devices. In general, a user uses an input button, a control stick, one key or a key combination, or a combination thereof to input data or a command. Circuitry in the input device converts the input data or command into a proper form for transmitting to the computer or device.

Such an input device generally uses a particular communication link to transmit the input data or command to the computer or device. An input device may be a wireless input device using a wireless communication link or a wired link using an electrical cable. Input devices with wired links may be implemented based on PS/2 keyboard interface, USB 1.0 and USB 2.0 and other interfaces. The wireless communication link may be implemented by a radiation transmitter to send the input to a corresponding radiation receiver at the computer or device. Many wireless input devices use RF radiation links based on different radio interfaces such as IEEE 802.5.14 for low speed links and wireless USB 2.0 and IEEE 1394 for relatively high speed links. Some of these wired or wireless input devices may use the Human Interface Device (HID) protocol over wired or wireless USB links or other non-USB communication links.

Wireless input devices beneficially increase the flexibility of the interaction between a user and a host computer in that no wired connection is required with the host computer. However, given that a wired connection generally provides a source of power for an input device, wireless input devices are required to be self-powered (e.g., battery-powered). Unfortunately, batteries used to power existing wireless input devices typically last for a period of time significantly less than the useful life of such devices. As a consequence, the convenience and value of such devices are diminished as a consequence of the need for regular battery replacement. Existing wireless input devices are also frequently of limited range and the wireless link established for communication with the host computer is often rather unreliable and/or exhibits a high latency. In addition, such wireless links are often relatively insecure and thus susceptible to eavesdropping or unauthorized monitoring.

SUMMARY OF THE INVENTION

A principal object of the present invention is to provide an effective and very manufacturable wireless transceiver system for computer input devices.

A further object of the present invention is to provide a wireless interface device for use in a host computer.

A yet further object of the present invention is to provide a wireless interface device for use in an input device such as a keyboard or a mouse.

A yet further object of the present invention is to provide a wireless interface device with built-in scanning and decoding functions for an input device such as a keyboard or a mouse.

A yet further object of the present invention is to provide a wireless interface device with power saving functions to extend the battery life of the input device.

A yet further object of the present invention is to provide a wireless interface device with the capability of automatically selecting between several communication frequencies or channels to improve communication reliability and to provide compatibility for various regulatory environments.

Another further object of the present invention is to provide a wireless interface device with the capability of automatically selecting between several data rates to improve reliability while not sacrificing speed of operation.

In accordance with the objects of this invention, a computer device is achieved. The device comprises a host computer comprising a central processing unit and a first wireless interface circuit for passing data between the central processing unit and an RF signal. An input device for the host computer comprises a user input mechanism and a second wireless interface circuit for passing data between the user input mechanism and an RF signal. The wireless interface circuits enable two-way wireless communication between the host computer and the input device.

Also in accordance with the objects of this invention, a wireless interface device for a keyboard of a computer system is achieved. The device comprises a radio transmitter and receiver. A modem encodes data to be sent by the radio transmitter and decodes data received by the radio receiver. A central processing unit is included. A direct signal connection is provided between the wireless interface circuit and a keyboard. A baseband circuit encrypts data to be transmitted and decrypts received data.

Also in accordance with the objects of this invention, a wireless interface device for a mouse of a computer system is achieved. The device comprises a radio transmitter and receiver. A modem encodes data to be sent by the radio transmitter and decodes data received by the radio receiver. A central processing unit is included. A direct signal connection is provided between the wireless interface circuit and a mouse. A baseband circuit encrypts data to be transmitted and decrypts received data.

Also in accordance with the objects of this invention, a baseband circuit device for a wireless input interface in a computer system is achieved. The circuit device comprises a means to encrypt a data stream, a means to generate a cyclic redundancy code for the data stream; and a means to format an output data stream comprising a header, the encrypted data stream, and the cyclic redundancy code.

Also in accordance with the objects of this invention, a modem circuit device for a wireless input interface in a computer system is achieved. The circuit device comprises a transmission encoder and a reception decoder.

Also in accordance with the objects of this invention, a radio transmitter circuit device for a wireless input interface in a computer system is achieved. The circuit device comprises a digital to analog converter to convert digital data to an analog voltage. A phase-locked loop generates an intermediate frequency signal. A modulator modulates the analog voltage and the intermediate frequency to thereby generate a modulated signal. An amplifier amplifies the modulated signal. An antenna transmits the amplified signal.

Also in accordance with the objects of this invention, a radio receiver circuit device for a wireless input interface in a computer system is achieved. The circuit device comprises an antenna to receive a signal. An amplifier amplifies the received signal. A phase-locked loop generates an intermediate frequency signal. A demodulator demodulates the amplified received signal with the intermediate frequency signal to thereby generate a demodulated signal. A slicer converts the demodulated signal into a digital bit stream.

Also in accordance with the objects of this invention, a phase-locked loop circuit device for a wireless input interface in a computer system is achieved. The circuit device comprises a phase frequency detector generating an error signal based on the phase difference between a reference frequency and a feedback frequency. A charge pump generates a voltage based on the error signal. A loop filter filters the charge pump voltage. A voltage controlled oscillator generates an oscillating signal based on the filtered charge pump voltage. A programmable divider divides the oscillating signal to create the feedback frequency. A sigma-delta modulator controls the programmable divider based on a sigma-delta modulation of the reference frequency and the feedback frequency.

Also in accordance with the objects of this invention, a power moding circuit device for a wireless input interface in a computer system is achieved. The circuit device comprises a DC to DC converter to generate a first DC voltage level that is higher than the interface power supply level. A power-ON reset circuit generates a reset signal for the wireless input interface based on the interface power supply level. A sleep mode circuit generates a sleep mode signal used to control reduced power consumption functions.

BRIEF DESCRIPTION OF THE DRAWINGS

In the accompanying drawings forming a material part of this description, there is shown:

FIG. 11 illustrates an eleventh preferred embodiment of the present invention showing a frame format generated by the baseband hardware of a wireless transceiver system.

DESCRIPTION OF THE PREFERRED EMBODIMENTS

The preferred embodiments of the present invention disclose wireless transceiver systems for computer devices. In several embodiments, various aspects of unique wireless transceiver systems, useful for operating keyboards and mouse inputs, are disclosed. It should be clear to those experienced in the art that the present invention can be applied and extended without deviating from the scope of the present invention.

Figure 1:
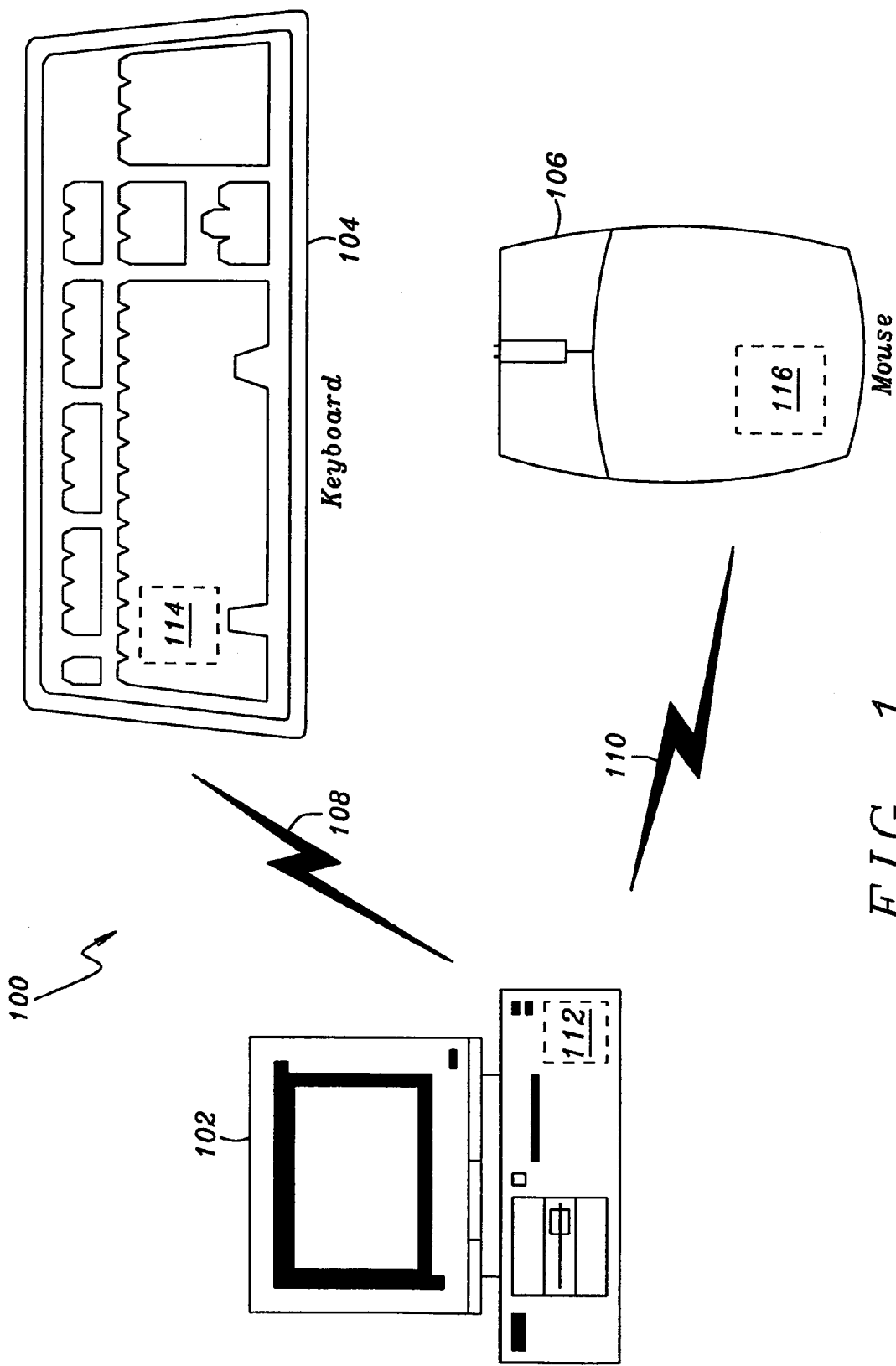
FIG. 1 illustrates a first preferred embodiment of the present invention showing a computer system incorporating wireless input interfaces.

Referring now to FIG. 1, a first preferred embodiment of the present invention is illustrated. A computer system 100 is shown incorporating a wireless input interface in accordance with the invention includes a host computer 102, a wireless keyboard 104 and a wireless pointing device or "mouse" 106. As illustrated in FIG. 1, the wireless keyboard 104 and the wireless mouse 106 are in communication with the host computer 102 over wireless communication links 108 and 110, respectively. As shown, the host computer 102 includes or is attached to a wireless interface unit 112 through which the communication links 108 and 110 are respectively established with a wireless interface unit 114 within the wireless keyboard 114 and a wireless unit 116 of the wireless mouse 106. The wireless interface unit 112 may be built into the chassis of the host computer 102 or added as an external peripheral device. As an external peripheral device, the wireless interface unit 112 may either be interfaced to the computer 102 through a wired USB connection or by other available means such as the PS/2 keyboard connector.

During operation of the system 100, the wireless keyboard 104 and the wireless mouse 106 interact with the host computer 102 via wireless communication links 108 and 110. In particular, the wireless interface unit 112 receives keystroke and other data originating from the wireless keyboard 104 and the wireless mouse 106 over wireless communication links 108 and 110 and passes it to the host computer 102 in such a way that the host computer 102 is unaware of the existence of the wireless links 108 and 110.

As is described hereinafter, the wireless interface units 112, 114 and 116 of the present invention are configured to enable the communication links 108 and 110 to exhibit low latency and high reliability relative to conventional approaches employed using wireless peripheral devices. As will also be described, the wireless interface units 114 and 116 respectively incorporated within the wireless keyboard 104 and the wireless mouse 106 are disposed to cycle among various power-saving modes so as to conserve battery power and thereby substantially reduce the frequency of required battery replacement operations.

Figure 2:
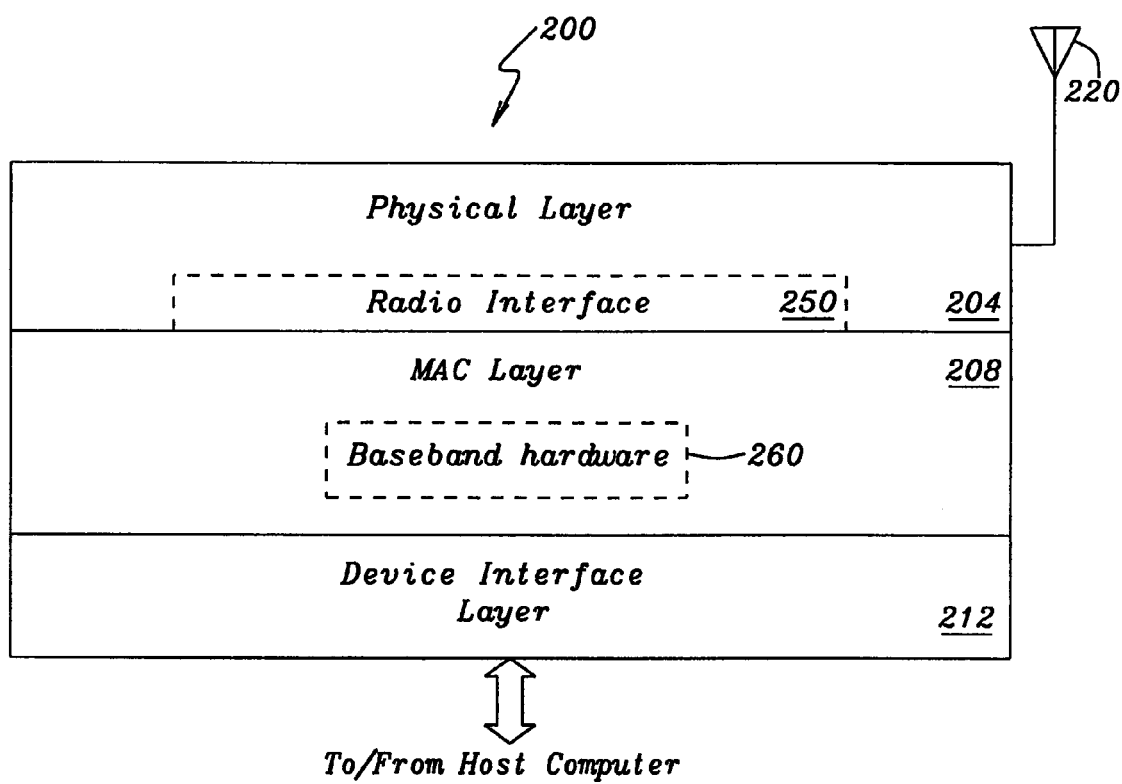
FIG. 2 illustrates a second preferred embodiment of the present invention showing physical, media access control (MAC), and device layers of the wireless input interface.

Referring now to FIG. 2, a second preferred embodiment of the present invention is illustrated. A view of the layered architecture 200 of the wireless interface unit 112 is shown. It is understood that in the exemplary embodiment the wireless interface units 114, 116 are of essentially the same general architecture. As will be apparent to those skilled in the art, the layers depicted in FIG. 2 may be realized in hardware, firmware, or as software instructions stored on a computer-readable medium. Referring to FIG. 2, the interface unit 112 is seen to include a physical layer 204, a media access control (MAC) layer 208, and a device interface layer 212. As shown, the physical layer 204 interfaces with an antenna element 220. The device interface layer 212 may be implemented as any known interface permitting the wireless interface unit 112 to interface with the host computer 102. Such a known interface may be designed to support communications between the host computer 102 and the wireless interface unit 112 in accordance with a standard communications protocol. For example, the device interface 212 may by designed to serve as a USB, PS2 or GPIO interface.

The MAC layer 208 serves to control access to the wireless communication links 108, 110. That is, MAC layer 208 is responsible for enabling data to be transferred between the device interface 212 and the physical layer 204, and vice-versa. As shown, a portion of the functions associated with the MAC layer 208 in the exemplary embodiment is carried out by baseband hardware 260, but this is certainly not required. One potential implementation of the MAC layer 208 is described in, for example, the above-referenced provisional application, Ser. No. 60/553,820.

As is discussed below, the physical layer 204 may comprise any structure or collection of elements functioning to transmit and receive bits of data over the wireless communication links 108, 110. As shown, the physical layer 204 includes a radio interface portion 250, which represents the registers and signals that are used to transfer messages between the physical layer 204 and the MAC layer 208.

Figure 3:
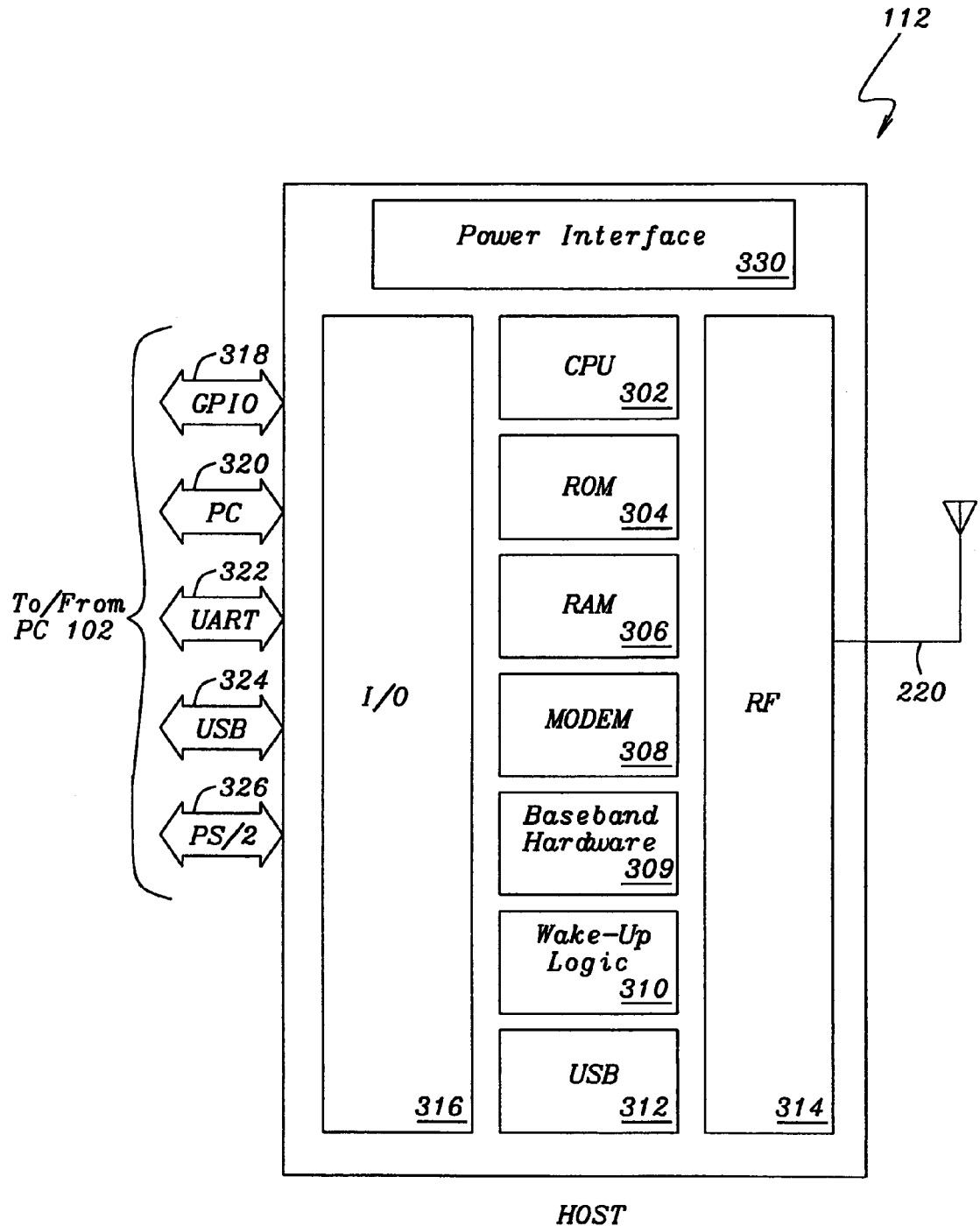
FIG. 3 illustrates a third preferred embodiment of the present invention showing a block diagram of the wireless interface unit resident in the host PC.

Referring now to FIG. 3, a third preferred embodiment of the present invention is illustrated. A block diagram of the wireless interface unit 112 transceiver is shown. As shown, the wireless interface unit 112 (also referred to herein as the host transceiver 112) includes a CPU 302 that is coupled via a CPU bus (not shown) to ROM 304, RAM 306, a modem 308, baseband hardware 309, wake-up logic 310, a universal serial bus (USB) module 312 and an input/output (I/O) module 316. Also shown coupled to the modem 308 is an RF unit 314, which is coupled to an antenna 220. A power interface portion 330 provides power regulation to both analog and digital components of the host transceiver 112. In one embodiment, the host transceiver 112 is realized as a single system-on-chip IC with protocol stack and application software being integrated in built-in mask ROM, but this is certainly not required.

In the exemplary embodiment, when the host transceiver 112 is transmitting information to one of the wireless devices 114, 116, the information is first encrypted, formatted and protected with a cyclical redundancy check (CRC) by the baseband hardware 309. The modem 308 then receives and encodes (e.g., with differential BPSK encoding) the formatted, encrypted and CRC protected information before it is up-converted for transmission by the RF portion 314.

When receiving a signal from one of the device transceivers 114, 116, the RF unit 314 down converts the received signal to an intermediate frequency (IF), and converts the IF frequency signal to a digital IF signal. The modem 308 then decodes the digital IF signal and checks the CRCs to regenerate the original encrypted information, which is then decrypted by the baseband hardware 309.

With respect to transmitting and receiving data, the modem 308 in the exemplary embodiment has four different modes: a high data rate (HDR) mode; a medium data rate (MDR) mode; a low data rate (LDR) mode and a spread mode. The HDR mode is the default mode, which can provide 150 kbps data transmission. The data rates for the MDR, LDR and spread mode are 30 kbps, 10 kbps and 13.64 kbps respectively. As described further herein, spread mode is used when there is interference from similar wireless device(s) (e.g., other host and device transceivers), and MDR is used when there is strong interference (e.g., narrow-band interference) such as from citizen band (CB) ratio.

In the exemplary embodiment, the host transceiver 112 is able to detect interference and switch to appropriate modes automatically. As a consequence, the host transceiver 112 provides highly reliable wireless data transfers even in an environment with multiple other wireless users. In the exemplary embodiment, the LDR mode is for European compliance purposes and may be omitted in transceivers intended for non-European markets. The data transmission rates of the exemplary embodiment (i.e., 150 kbps, 30 kbps, 10 kbps and 13.64), are more than sufficient for typical manual input devices (e.g., the keyboard 104 and mouse 106), with very little or no perceptible latency.

The RF portion 314 in the exemplary embodiment operates to transmit and receive signals in accordance with the operating mode (i.e., the HDR, MDR, LDR and spread mode) of the modem 308. In MDR mode for example, the RF portion 314 supports multiple selectable transmit frequencies so data may be selectively transmitted over a frequency channel that is substantially free from a strong narrowband interferer such as a citizens band (CB) radio.

The wake-up logic 310, as described further herein, is configured to place the host transceiver 112 in a sleep mode during period of inactivity by shutting down a system clock (not shown) of the host transceiver 112. When a wake-up event occurs (e.g., expiration of a timer) the wake-up logic 310, in combination with the power interface 330, wakes up the host transceiver 112 by enabling the system clock (not shown), and then wakes up the CPU 302 after the system clock is stable.

In the exemplary embodiment, the I/O unit 316 of the host transceiver 112 is programmable to allow general-purpose I/O pins (not shown) of the host transceiver 112 to be selectively dedicated to a variety of interface communication protocols for communication with the host computer 102. As shown in FIG. 3 for example, the I/O unit 316 is programmable so as to allow the following five I/O communication protocols to be selectively used with the general-purpose I/O pins: a general purpose input/output (GPIO) 318, an intelligent interface controller (I2C) path 320, a universal asynchronous receiver/transmitter interface (UART) 322, a USB interface 324 and a bidirectional synchronous serial interface (PS/2) 326.

The I2C interface 320 is a two-wire, bi-directional serial bus, which provides a simple method of data exchange between devices. In the exemplary embodiment, the I2C interface is used for downloading executable programs from external EEPROM to RAM 306 (e.g., to change functionality of certain aspects of the host transceiver), and/or reading configuration parameters that are stored in external EEPROM. In one embodiment, (e.g., when CPU clock is 12 MHz) the clock speed for the I2C interface is software programmable from 200 Hz to 400 KHz (When CPU clock is 12 MHz). The host transceiver 112 may either be selected (e.g., via software) to be a master or a slave device. The UART interconnect 322 provides serial communications between the host transceiver and terminal equipment (e.g., the host computer 102). In one embodiment, the baud rate is software programmable from 250 bps to 330 Kbps. The universal Serial Bus (USB) interface 324 is a personal computer (PC) interconnect that can support simultaneous attachment of multiple devices. The USB module 312 in the present embodiment is realized by dedicated hardware and includes a USB function controller (not shown) and a full speed (12 Mb/s) USB transceiver (not shown). The PS/2 interface 326 is a two-wire (DATA, CLOCK), bi-directional synchronous serial interface. The PS/2 interface 326 in one embodiment includes two PS/2 interfaces: one for communications with the keyboard 104 and the other for communications with the mouse 106.

In one embodiment, dedicated hardware in the host transceiver 112 is associated with one or more of the above described communication protocols. Although it is not necessary to dedicate hardware for I/O communications, latency may be substantially reduced over alternative CPU-driven software implementations.

Figure 18:
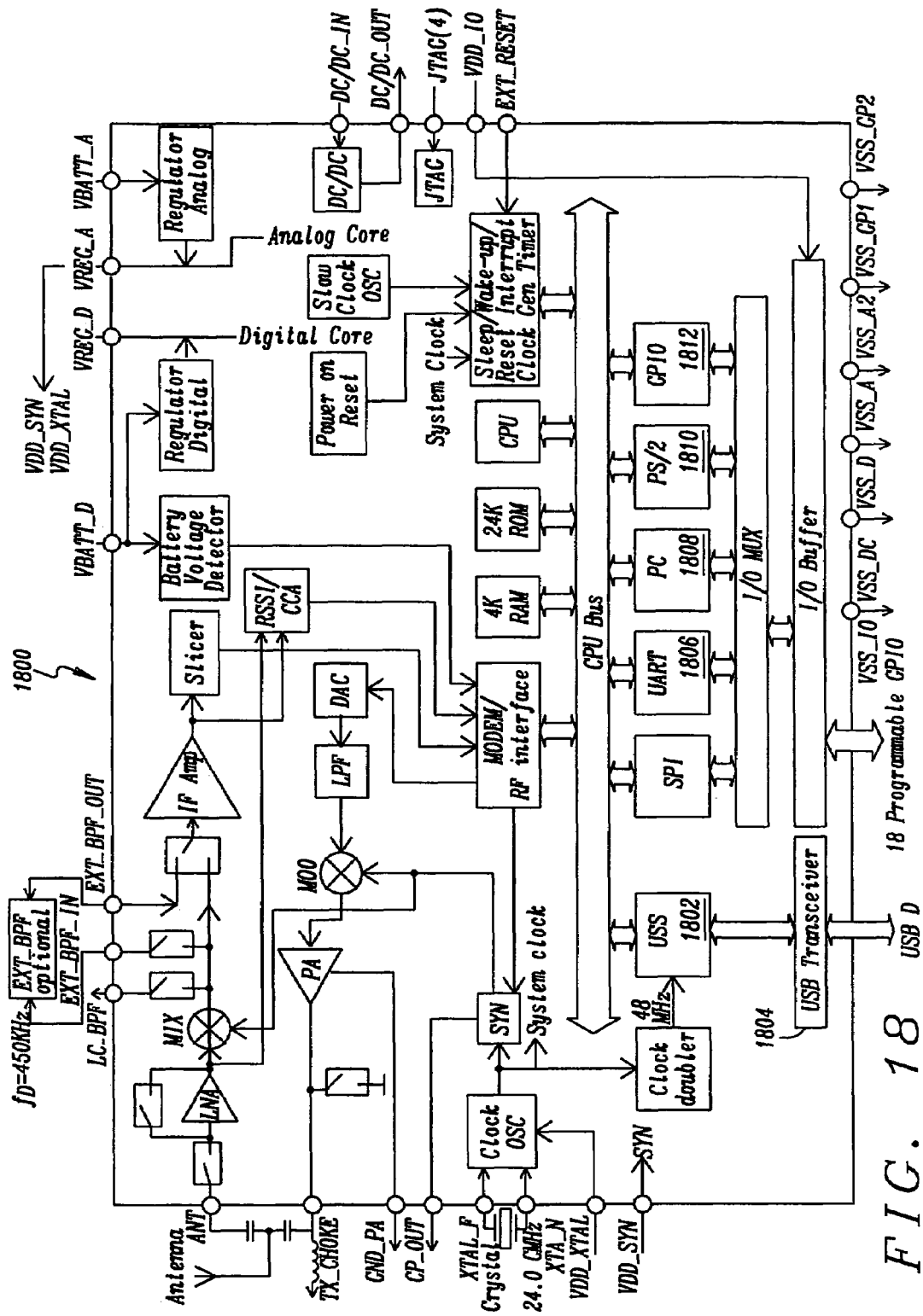
FIG. 18 illustrates an eighteenth preferred embodiment of the present invention showing a block diagram of a host PC wireless transceiver system.

Referring briefly to FIG. 18, an eighteenth preferred embodiment of the present invention is illustrated. A block diagram of a host transceiver 1800 implemented as a single system-on-chip IC with dedicated hardware for I/O communications is shown. As shown, the USB module 312 in the present embodiment is realized by dedicated USB function controller 1802 and full speed (12 Mb/s) USB transceiver 1804. In addition, the UART interconnect 322, I2C interface 320, PS/2 interface 326 and the GPIO 318 are associated with dedicated UART 1806, I2C 1808, PS/2 1810 and GPIO 1812 hardware respectively.

Figure 4:
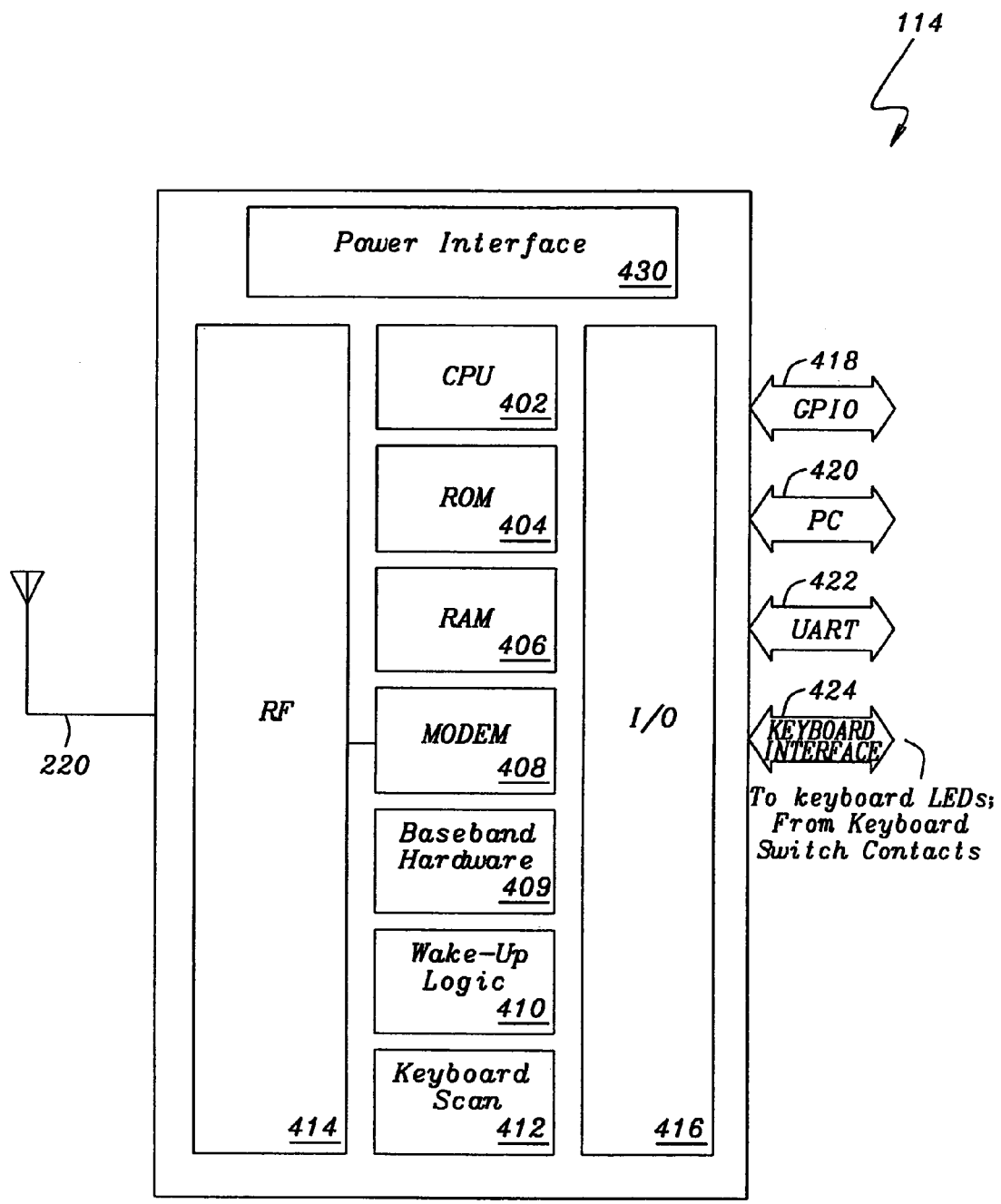
FIG. 4 illustrates a fourth preferred embodiment of the present invention showing a block diagram of the wireless interface unit resident in the keyboard.

Referring now to FIG. 4, a fourth preferred embodiment of the present invention is illustrated. A block diagram is shown depicting an exemplary embodiment of the wireless unit 114 of FIG. 1. As shown, the wireless unit 114 (also referred to herein as the keyboard transceiver 114) includes a CPU 402 that is coupled to ROM 404, RAM 406, a modem 408, baseband hardware 409, RF unit 414 and an I/O module 416, which in the exemplary embodiment, are substantially the same as the corresponding functional components within the host transceiver 112. Also shown are wake-up logic 410 and a keyboard scan module 412. As shown, four exemplary communication protocols are available for the keyboard transceiver 114 to communicate with other devices: a general purpose input/output (GPIO) 418, an intelligent interface controller (I2C) path 420, a universal asynchronous receiver/transmitter interface (UART) 422, and a keyboard interface 424.

The keyboard interface 424 in one embodiment is realized with 20 GPIO ports that are dedicated to 20 corresponding columns of a keyboard's bare key switch contacts and 8 GPIO ports that are dedicated to 8 corresponding rows of the keyboard's bare key switch contacts. In addition, three optional high-drive open-drain outputs support up to three LEDs on the keyboard. In this embodiment, the I/O module 416 is programmed to switch the 28 GPIO ports dedicated to the keyboard to the keyboard scan module 412.

The keyboard scan module 412 detects key presses and releases by receiving inputs from the keyboard interface 424 and performing debouncing and rollover handling. Debouncing is performed by keeping an image of the keyboard state in memory for the last N1 (e.g., three) scan cycles. In the exemplary embodiment, the keyboard scan module 412 does not report a state change until it persists for N1 scan cycles (the scan rate is approximately N2 (e.g., four) milliseconds per scan). As a consequence, the debounce time is approximately N1*N2 milliseconds. In one embodiment, the values of N1 and N2 may be changed via the host transceiver 112 by updating EEPROM of the host transceiver 112 with new values. The host transceiver 112 then sends the updated information to the keyboard transceiver 114 in a configuration message when communication is established with the host transceiver 112.

In operation, each time a key press or release is detected, the keyboard scan module 412 provides key code (i.e., column and row) information to the CPU 402, and the CPU 402 generates a message indicating the row and column. The message with row and column information is than transmitted from the keyboard transceiver 114 to the host transceiver 112. The host transceiver 112 receives the message and then maps the row and column data into key codes, macros, or special functions.

After a period of inactivity, the CPU 402 instructs the wake-up logic 410, as described further herein, to place the keyboard transceiver 114 in a sleep mode. The wake-up logic 410, in combination with the power interface 430, then effectively shuts down the CPU 402 by depriving it of a clock signal. In addition, a scan oscillator (not shown) in the keyboard scan module 412 is also deactivated so that the keyboard scan module 412 no longer carries out the keyboard scanning described above. Instead, the row inputs to the keyboard scan module 412 are logically OR-ed together so that any key-press will trigger the keyboard scan module 412 to restart the scanning process.

When the keyboard scan module 412 (operating in sleep mode) detects a key press, it sends a key press notification signal to the wake-up logic 410, which in combination with the power interface 430, brings the keyboard transceiver 114 out of sleep mode by reactivating the clock signal to the CPU 402. Additional details of communications between the keyboard transceiver 114 and the host transceiver 112 when the keyboard transceiver 114 enters and exits sleep mode are described in the above-referenced provisional application, Ser. No. 60/553,820.

Figure 19:
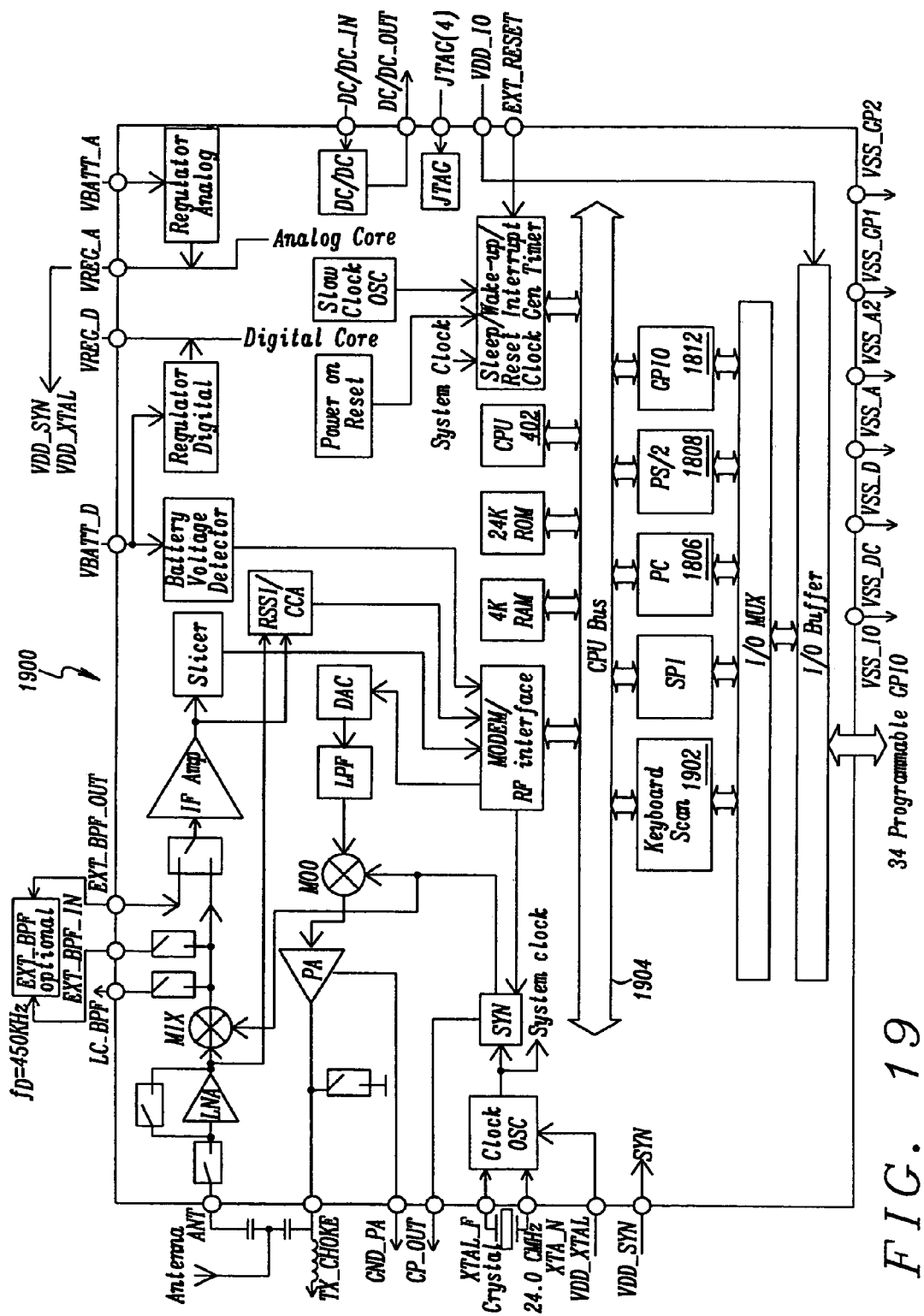
FIG. 19 illustrates a nineteenth preferred embodiment of the present invention showing a block diagram of a wireless keyboard transceiver system.

Referring now to FIG. 19, a nineteenth preferred embodiment of the present invention is illustrated. A block diagram of a keyboard transceiver 1900 implemented as a single system-on-chip IC with dedicated hardware for the keyboard scan module 412 is shown. As shown, a dedicated keyboard scan module 1902 is disposed to scan the keyboard 104 and send column and row information to the CPU 402 via a CPU bus 1904.

Figure 5:
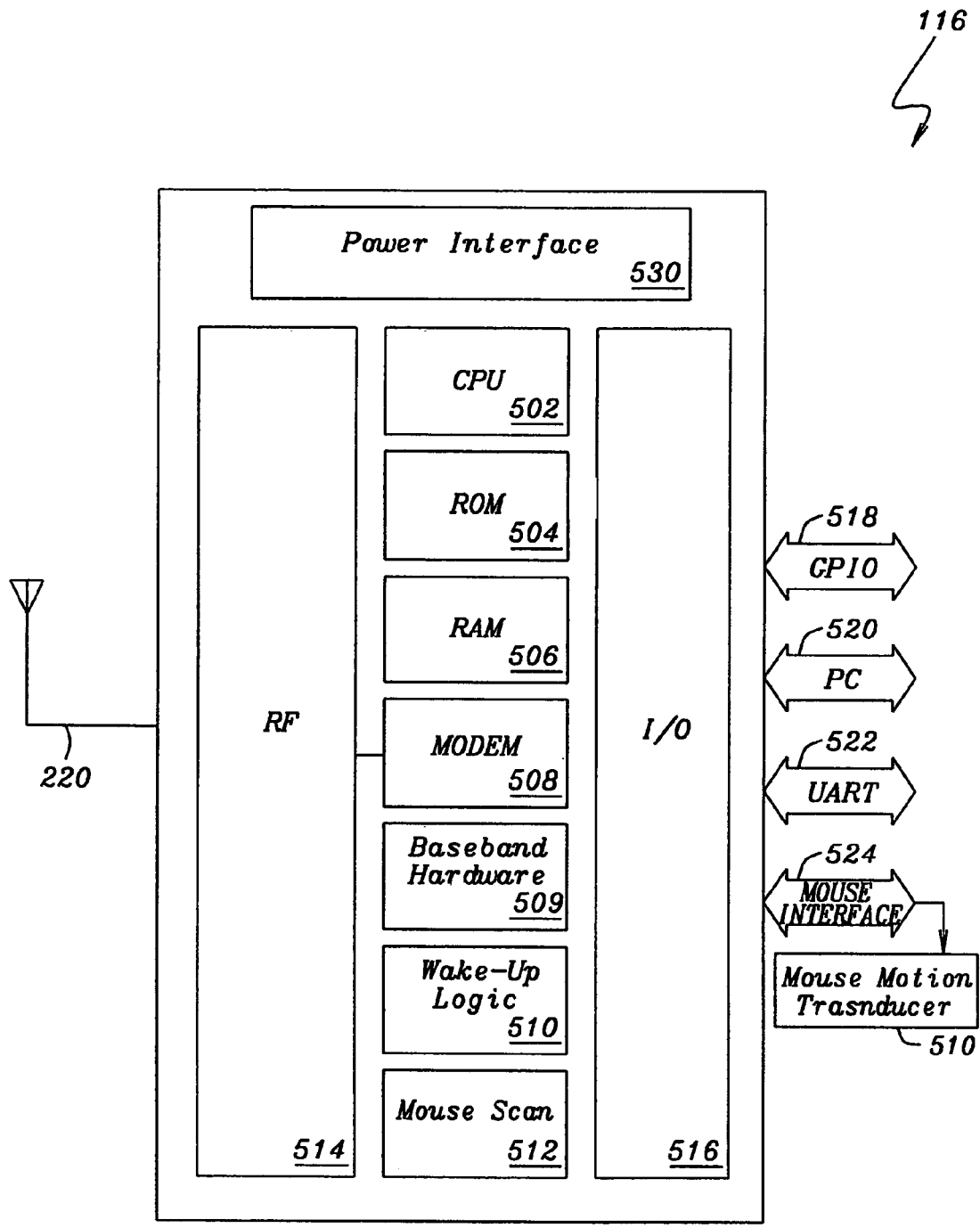
FIG. 5 illustrates a fifth preferred embodiment of the present invention showing a block diagram of the wireless interface unit resident in the mouse.

Referring now to FIG. 5, a fifth preferred embodiment of the present invention is illustrated. A block diagram depicting an exemplary embodiment of the wireless unit 116 of FIG. 1 is shown. As shown, the wireless unit 116 (also referred to herein as the mouse transceiver 116) includes a CPU 502 that is coupled to ROM 504, RAM 506, a modem 508, baseband hardware 509, RF unit 514, and the I/O module 516, which in the exemplary embodiment, are substantially the same as the corresponding functional components within the keyboard transceiver 114. Also coupled to the CPU 502 is a wake-up logic portion 510, which is in communication with a mouse scan module 512. As shown, four exemplary communication protocols are available for the mouse transceiver 114 to communicate with other devices: a general-purpose input/output (GPIO) 518, an intelligent interface controller (I2C) path 520, a universal asynchronous receiver/transmitter interface (UART) 522, and a mouse interface 524.

In the exemplary embodiment, the mouse transceiver 116 receives, via a mouse interface 524, motion signals from mouse motion transducer 510, which is configured and positioned within the wireless mouse 106 to convert motion of the wireless mouse 106 into the motion signals. Advantageously, the configuration of the mouse interface 524 in this embodiment is selectable to conform to the communication protocol of the mouse motion transducer 510, which may vary depending upon the manufacturer and the type of technology (e.g., mechanical or optical position tracking) utilized by the wireless mouse 106. Specifically, the I/O module 516 is programmable so that GPIO pins (not shown) of the mouse transceiver 116 are dedicated for communications in accordance with the protocols utilized by the wireless mouse 106.

In one embodiment for example, the mouse interface 524 is configured to communicate as an optical mouse interface according to a secure digital I/O communication protocol (SDIO), which uses an I2C-like read/write sequencing scheme in which the mouse transceiver 116 operates as the master and the wireless mouse 106 as the slave. This configuration may be used, for example, to communicate with Agilent™ wireless mouse devices with SDIO interface capability including Agilent™ device number ADNS-2030. In another embodiment, the mouse interface 524 is configured to communicate as an optical mouse interface according to SPI protocols. In this embodiment, the mouse interface 524 includes four signals: a clock (CLK), a slave output (SO), a slave input (SI) and a slave select (CS), and the mouse transceiver 116 operates as the master while an optical sensor in the mouse 106 operates as the slave.

Figure 6:
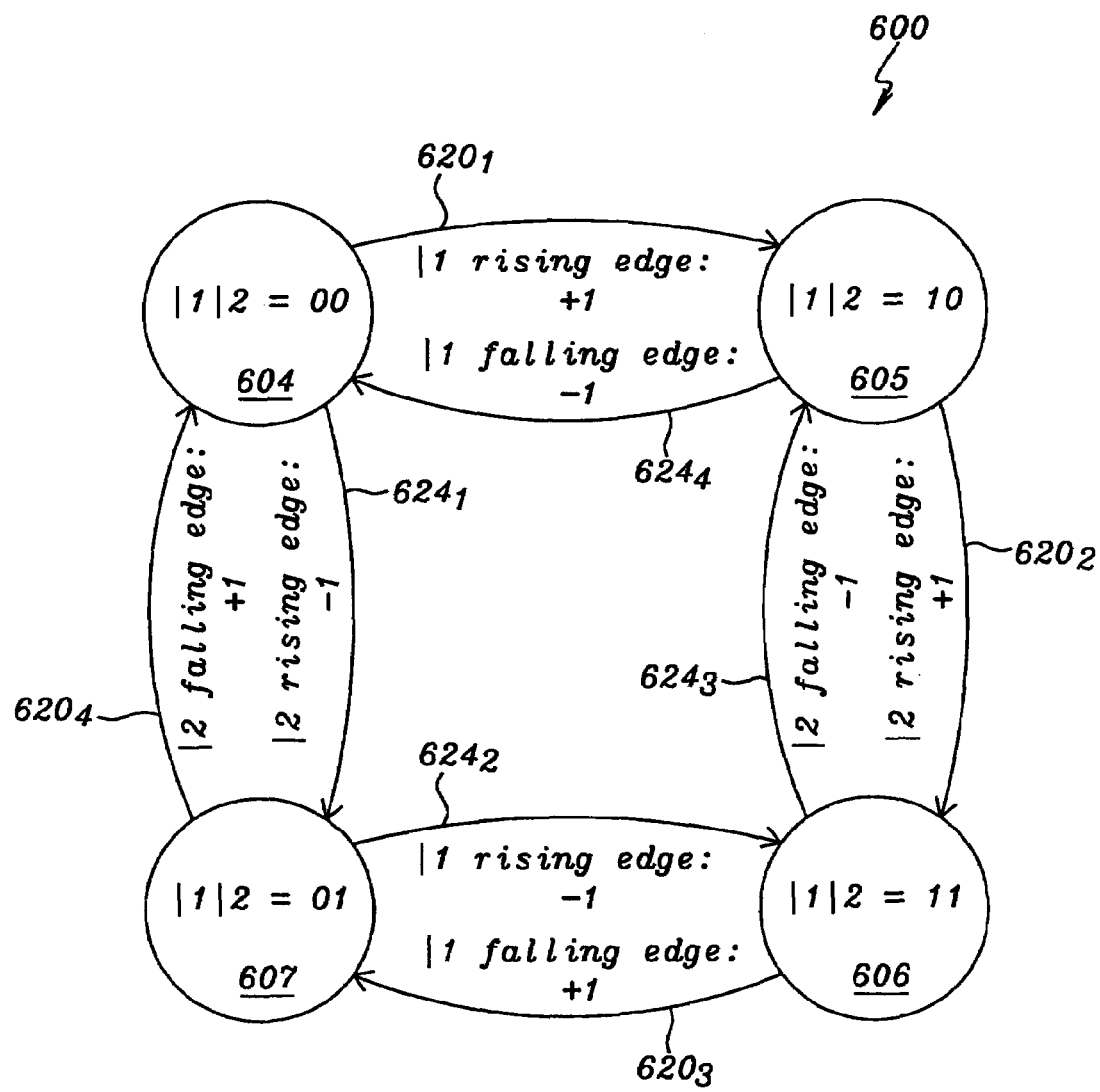
FIG. 6 illustrates a sixth preferred embodiment of the present invention showing a state transition diagram for performing quadrature detection (QD) of a mechanical mouse as integrated into a wireless mouse transceiver system.

When the wireless mouse 106 utilizes mechanical position tracking technology, the mouse interface 524 includes one pair of quadrature signals for each of the X, Y, and Z axes, wherein the X and Y axes are associated with the translational movement of the wireless mouse 106 and the Z-axis is associated with movement of a roller ball of the wireless mouse 106. In the exemplary embodiment, the mouse scan module 512 operates in either a mechanical mode or an optical mode depending upon whether the wireless mouse 106 utilizes mechanical or optical position tracking. When operative in the mechanical mode, a single-axis state machine of the type represented by the state transition diagram 600 of FIG. 6 is executed by the mouse scan module 512 with respect to each of three perpendicular directional axes (i.e., the X, Y and Z axes). Operation in the mechanical mode also relies upon a button press detector (not shown), which preferably implements "debouncing" in the same manner as was described above with reference to the keyboard scan module 512. Although the button press detector operates substantially identically in the mechanical and optical modes, in the exemplary embodiment the mouse scan module 512 does not execute state machines during operation in the optical mode. Instead, the mouse scan module 512 sends serial messages to the wireless mouse 106 and receives back position difference information or "deltas". These position deltas replace the counter values utilized during mechanical mode operation within the mouse position reports generated by the mouse scan module 512.

As is indicated by the diagram 600, each single-axis state machine transitions between a set of four states: a first state 604, a second state 605, a third state 606, and a fourth state 607. Each state machine also accepts a pair of quadrature counter inputs (I1 and I2) from the wireless mouse 106 which are determinative of the transitions among the states 604-607. For example, receipt of an I1 rising edge signal when in state 604 results in a transition to state 605. As shown, each clockwise transition 620 within the state diagram 600 corresponds to a positive incrementing (+1) of a counter maintained by the mouse scan module 502 for the given one of the three axes. Similarly, each counterclockwise transition 624 corresponds to a decrementing (−1) of the counter. The value of this counter, as well as the values of the counters associated with each of the other two axes, are communicated to the host transceiver 112 in a mouse report message when either the counter exceeds a predefined threshold received from the host transceiver 112 by the wireless mouse 106 at the time of system initialization, or when a predefined time interval expires (and the value of the counter is greater than or equal to 2). In the exemplary embodiment this predefined time interval is also received by the wireless mouse 106 from the host transceiver 112 during system initialization. In the exemplary embodiment the same predefined time interval and threshold are applicable to each of the three axes.

In the interests of minimizing power consumption, the state machines 604-607, counters, and comparators described above will generally be implemented as asynchronous logic, driven exclusively by the quadrature inputs (I1, I2). Once a mouse report message generated by the wireless unit 116 is acknowledged by the host transceiver 112, the wireless unit 116 shuts down power intensive operations (e.g., the CPU 502, modem 508 and RF portion 514) of wireless unit 116 and enters a sleep state. While the wireless unit 116 is in this sleep state, only its input buffers are disposed to receive the quadrature inputs (I1, I2) and button signals, while asynchronous logic and a millisecond slow clock remain in operation.

In the exemplary embodiment, the wake-up logic portion 510, which receives mouse reports from the mouse scan unit 512, functions to rouse the wireless unit 116 from sleep in response to one of three events: (1) the mouse scan module 512 reports that the predefined counter threshold discussed above has been exceeded, (2) a mouse button has been pressed, or (3) a slow clock active during sleep state counts down through a reporting timeout interval previously specified by the host transceiver 112. In one embodiment, the mouse scan module 512 is realized by hardware that is dedicated to scanning the wireless mouse 106. In this embodiment, the I/O module 516 is programmable to direct inputs from specific GPIO pins to the appropriate dedicated hardware.

Figure 20:
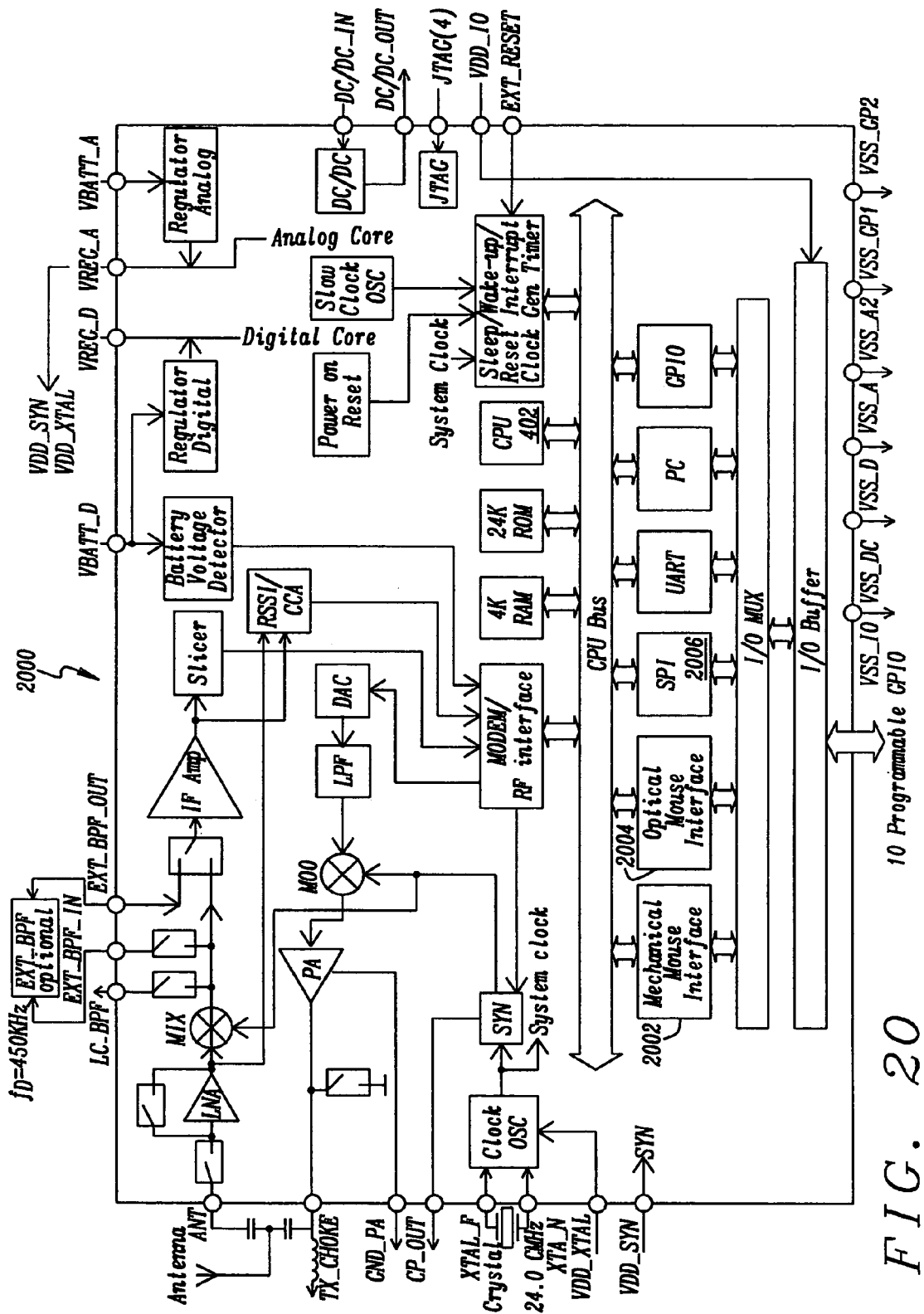
FIG. 20 illustrates a twentieth preferred embodiment of the present invention showing a block diagram of a wireless mouse transceiver system.

Referring now to FIG. 20, a twentieth preferred embodiment of the present invention is illustrated. The mouse scanning module 512 may be realized by a mechanical mouse interface portion 2002 the optical interface portion 2004 (e.g., to receive SDIO communications) and/or the SPI portion 2006 as shown. Under certain circumstances, the host wireless interface unit 112 may request to set or read a group of GPIO pins of a device wireless interface unit 114, 116. To this end, the host wireless interface unit 112 conveys such a request to the device transceiver 114, 116 by way of a GPIO read or GPIO write message containing an identification of the group number. In the case of a GPIO write message, the value to be written is also provided. Upon receipt of a GPIO read message, the device transceiver 114, 116 responds with a GPIO data message containing the requested data. It is the responsibility of the host transceiver 112 to write a "1" to any input bit before it is read.

Figure 7:
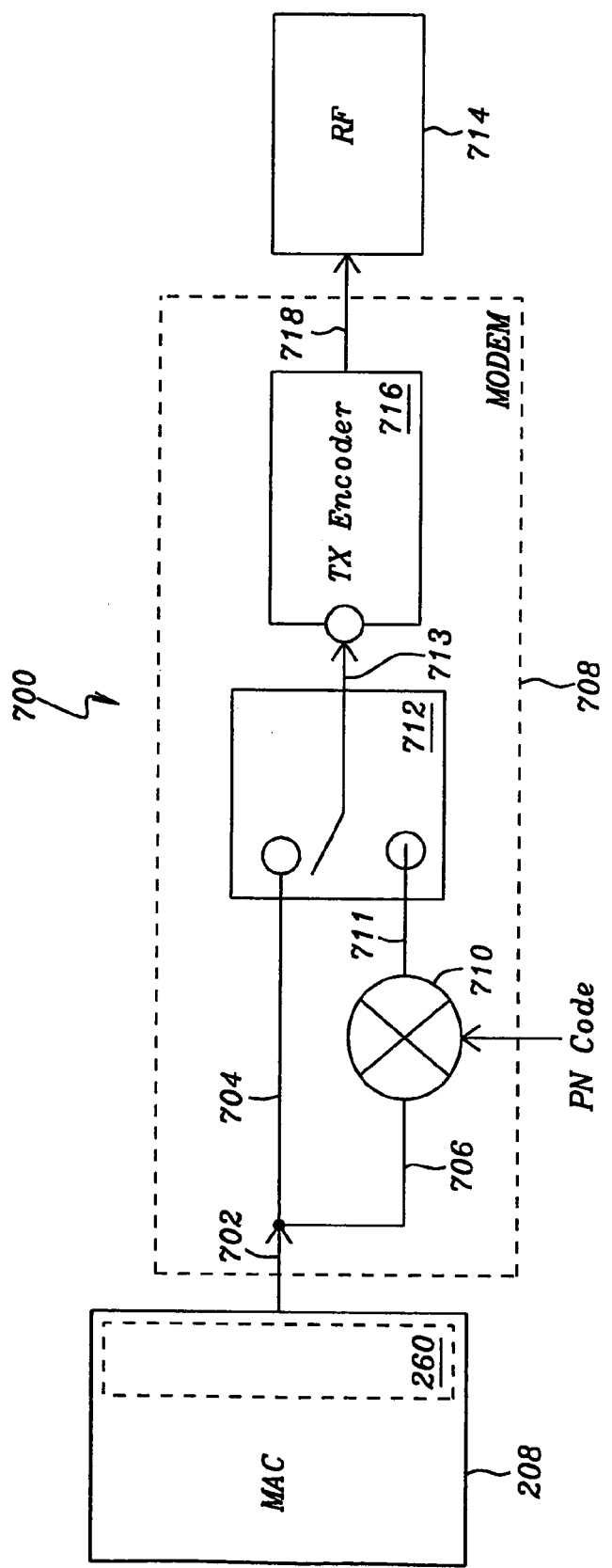
FIG. 7 illustrates a seventh preferred embodiment of the present invention showing a block diagram of a transmitter chain of the physical layer of a wireless transceiver system.

Referring now to FIG. 7, a seventh preferred embodiment of the present invention is illustrated. A block diagram depicting a transmitter chain 700 of the physical layer 204 of the host, keyboard and mouse transceivers 112, 114, 116 of FIGS. 3, 4 and 5 is shown according to an exemplary embodiment. As shown, a modem 708 receives an information bit stream 702 from the MAC layer 208 that has been formatted, CRC protected and encrypted by baseband hardware 260 within the MAC layer 208.

Referring now to FIG. 11, an eleventh preferred embodiment of the present invention is illustrated. An exemplary frame format 1100 that be generated by the baseband hardware 260 is shown. As shown, the frame includes a 16-bit preamble, a 22-bit header, a variable length payload (e.g., 0 to $(2^7-1)*8$ bits) and a 16-bit payload CRC. The header is organized into seven components: a 1-bit transmit sequence number, a 1-bit receive sequence number, a 1-bit data present/acknowledge-only indication, a reserved bit, a 7-bit PL-length indication, a 3-bit device indicator and an 8-bit header CRC.

In one embodiment, the sixteen-bit long sequence of the preamble is generated from an 11-bit ID with extended BCH code (16, 11), which provides the minimum distance of 4 between long sequences. The generator polynomial of BCH (15, 11) in this embodiment is:

$g(x)=x^4+x+1$, and the generator polynomial of extended BCH (16, 11) is:

$gext(x)=g(x)*(1+x)=x^5+x^4+x^2+1$, wherein i(x) denotes the 11-bit ID, and the output codeword is:

$c(x)=i(x)*x^5+\{i(x)*x^5\} \bmod g_{ext}(x)$.

The 7-bit PL-length indication is used to indicate the length of the payload in bytes. When an acknowledge signal is transmitted, the default PL-length is zero. The 3-bit device indicator is used to identify a mouse as 000 and a keyboard as 001. The polynomial for the 8-bit header-CRC is:

$g(x)=x8+x^2+x+1$, and the polynomial for the payload-CRC is:

$g(x)=x^{16}+x^{15}+x^2+1$

In one embodiment, only the payload of the packet is encrypted, which is carried out by well known techniques. As shown, the payload-encrypted, formatted and CRC protected bit stream 702 is coupled to an encoder 716 of the modem 708 via either a spreading path 706 or a normal path 704 depending upon a position of a switch 712 that is coupled to the input of the encoder 716. As shown, the spreading path 706 includes a mixer 710, which is injected with a pseudorandom noise (PN) sequence. The output of the encoder 716 (and the modem 708) is coupled to an RF unit 714.

Figure 21:
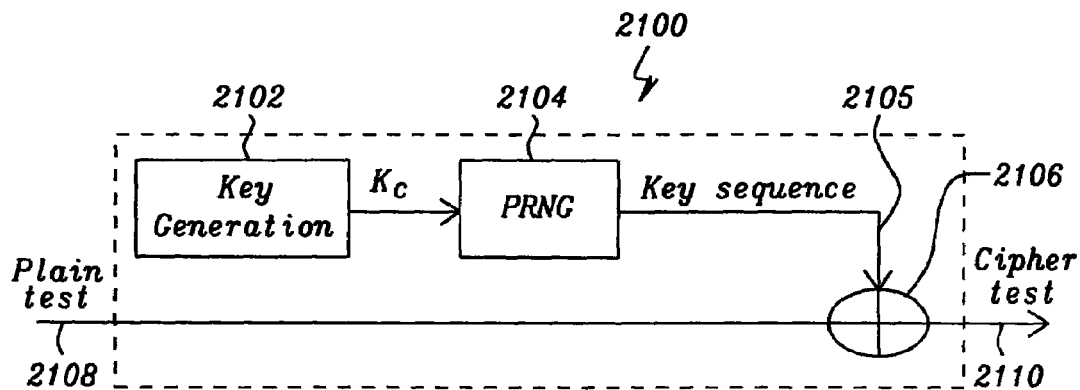
FIG. 21 illustrates a twenty first preferred embodiment of the present invention showing an encryption module used to encrypt the payload of each data frame of a wireless mouse transceiver system.

Referring now to FIG. 21, a twenty first preferred embodiment of the present invention is illustrated. One embodiment of an encryption module 2100 which may be implemented within the wireless units 112, 114, 116 to encrypt the payload of a data frame is shown. In one embodiment, for example, the encryption module 2100 is realized by hardware in the baseband hardware portions 309, 409, 509 in the wireless units 112, 114, 116. As shown, a key generation module 2102 is coupled to a pseudorandom number generator (PRNG) 2104, which is coupled to an XOR portion 2106. A plain text payload 2108 is also shown as an input to the encryption module 2100, which is also coupled to the XOR portion 2106. In operation, the key generation module 2102 generates an encryption key $K_C$, which is output to the PRNG 2104. As shown, the PRNG 2104 receives the encryption key $K_C$, and generates a key sequence 2105, which is received by the XOR portion 2106. The XOR portion 2106 then performs an exclusive OR operation on a plain text payload 2108 and the key sequence 2105 to generate a cipher text payload 2110. The cipher text payload 2110 is then formatted into a packet as described, for example, with reference to FIG. 11. In one embodiment, the PRNG 2104 generates a new key sequence for each payload except for retransmitted packets. Any retransmitted packet will have the same key as the packet originally transmitted.

Figure 22:
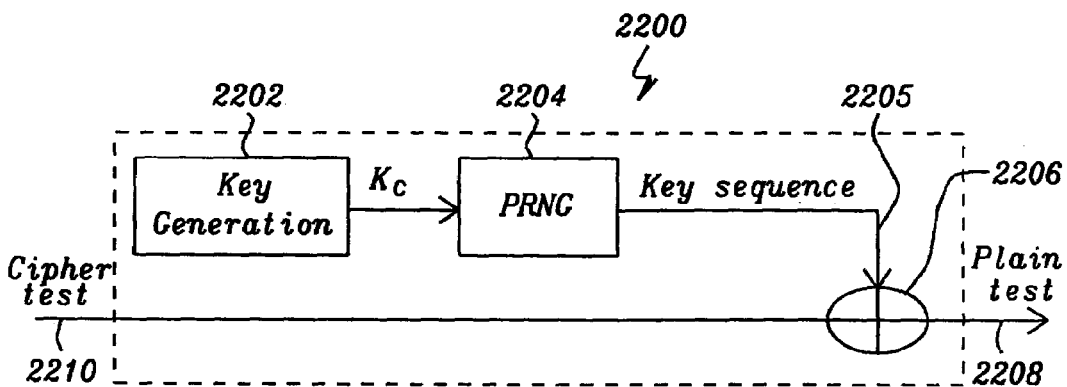
FIG. 22 illustrates a twenty second preferred embodiment of the present invention showing a decryption module used to decrypt an encrypted payload of a data packet of a wireless mouse transceiver system.

Referring now to FIG. 22, a twenty second preferred embodiment of the present invention is illustrated. One embodiment of a decryption module 2200, which may be implemented within the wireless units 112, 114, 116 to decrypt an encrypted payload of a data packet is shown. In one embodiment, for example, the decryption module 2200 is realized by hardware in the baseband hardware portions 309, 409, 509 in the wireless units 112, 114, 116. As shown, a key generation module 2202 is coupled to a pseudorandom number generator (PRNG) 2204, which is coupled to an XOR portion 2206. A cipher text payload 2210 is also shown as an input to the decryption module 2200, which is also coupled to the XOR portion 2206. In operation, the key generation module 2202 generates an encryption key $K_C$, which is output to the PRNG 2204. As shown, the PRNG 2204 receives the encryption key $K_C$, and generates a key sequence 2205, which is received by the XOR portion 2206. The XOR portion 2206 then performs an exclusive OR operation on the cipher text payload 2210 and the key sequence 2205 to generate a plain text payload 2208. The MAC layer 208 then processes the plain text payload 2208. As described in the above-referenced provisional application, Ser. No. 60/553,820, in one embodiment, each wireless unit 112, 114, 116 is either pre-assigned a device ID or is assigned a dynamically generated device ID at pairing. In one embodiment, the key generators 2102, 2202 of the encryption and decryption modules 2100, 2200 utilize the device IDs when generating an encryption key $K_C$.

For example, the 11-bit ID of a host transceiver 112 may be denoted as x10x9 . . . x1x0 and the 11-bit ID of a keyboard transceiver 114 may be denoted as y10y9 . . . y1y0. The encryption key $K_C$ in this embodiment is defined as:

$$K_C=[x_{10}x_9 \ldots x_1x_0y_{10}y_9 \ldots y_1y_0] \bmod g(x),$$

where $g(x)=x^{24}+x^{23}+x^{14}+x^{12}+x^8+1$.

Figure 23:
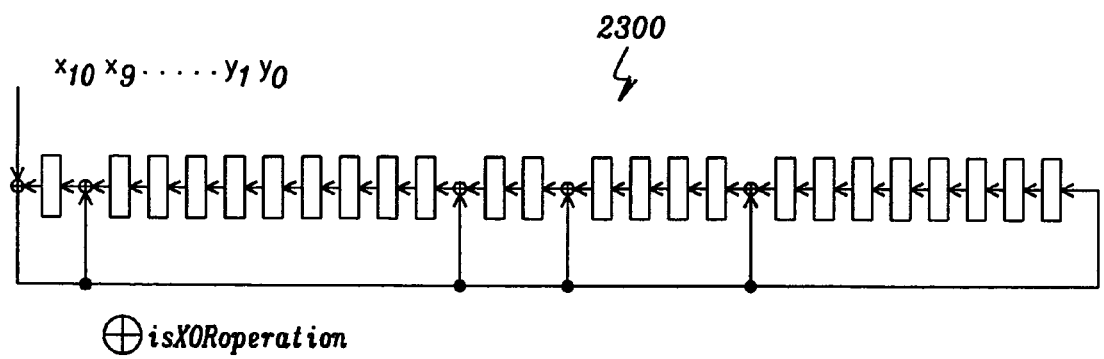
FIG. 23 illustrates a twenty third preferred embodiment of the present invention showing a key generation unit of a wireless mouse transceiver system.

In the exemplary embodiment, the key generation units 2102, 2202 are realized by a linear feedback shift register (LFSR) 2300. This is illustrated in FIG. 23 as the twenty third preferred embodiment of the present invention. The IDs of the host transceiver 112 and the keyboard transceiver 114 seed the LFSR to generate a 24-bit key.

Figure 24:
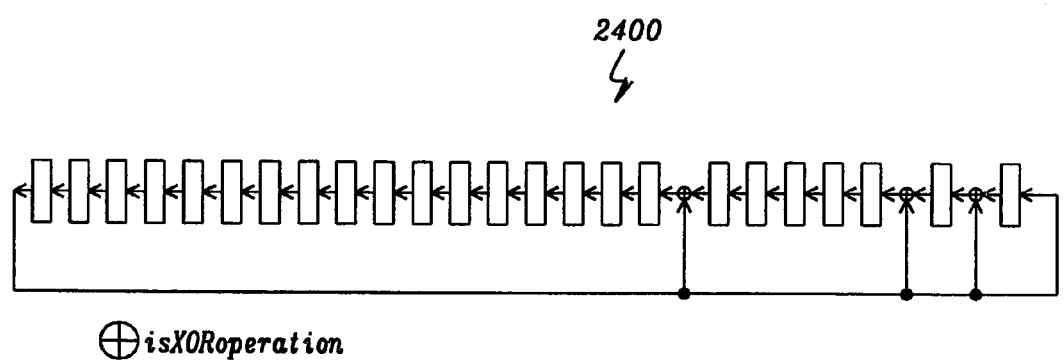
FIG. 24 illustrates a twenty fourth preferred embodiment of the present invention showing a pseudo random number generator (PRNG) of a wireless mouse transceiver system.

Referring now to FIG. 24, a twenty fourth preferred embodiment of the present invention is illustrated. A PRNG 2400 used to implement the PRNGs 2104, 2204 of FIGS. 21 and 22 is shown. As shown, the PRNG 2400 is realized by an LFSR with 24 shift registers. In operation, the encryption key $K_C$ is used to initialize the 24 shift registers of the PRNG 2400. A 24-bit random number is read from the PRNG 2400 and exclusively OR-ed (XOR) with $K_C$ to produce a 24-bit key sequence (e.g., the 24-bit key sequences 2105, 2205).

Referring again to FIG. 7, in the exemplary embodiment of the modem 700, the bit stream 702 from the MAC layer 208 is either routed to the encoder 716 via the spreading path 706 or the normal path 704 depending upon the transmission mode that the wireless interface unit 112, 114, 116 is operating in. Specifically, if the modem 708 is in spread mode, the switch 712 couples the encoder 716 to the spreading path 706, and the information stream 702 is spread by a pseudorandom noise (PN) code at the mixer 710. The spread bit stream 711 is then encoded and filtered by the encoder 716 before being relayed to the RF unit 714. In one embodiment, the PN code is an 11 bit code, which increases the processing gain and reduces, by eleven times, the amount of information in the bit stream. In the exemplary embodiment, when the modem 708 is operating in spread mode, the information stream 702 is a 150 kbps bit stream that is spread by the PN sequence. As a consequence, the bit rate of the spread bit stream 702 is 150 kbs, but the information rate is reduced by eleven times to 13.64 kbps.

When the modem 708 is operating in a HDR, MDR or LDR mode, the switch 712 is positioned to couple the information bit stream 702 directly to the encoder 716 without being spread. Once encoded (e.g., BPSK encoded) and filtered by the encoder 716, the encoded bit stream 718 is forwarded to the RF unit 714 where it is converted from a digital to an analog signal and up-converted for transmission.

Figure 8:
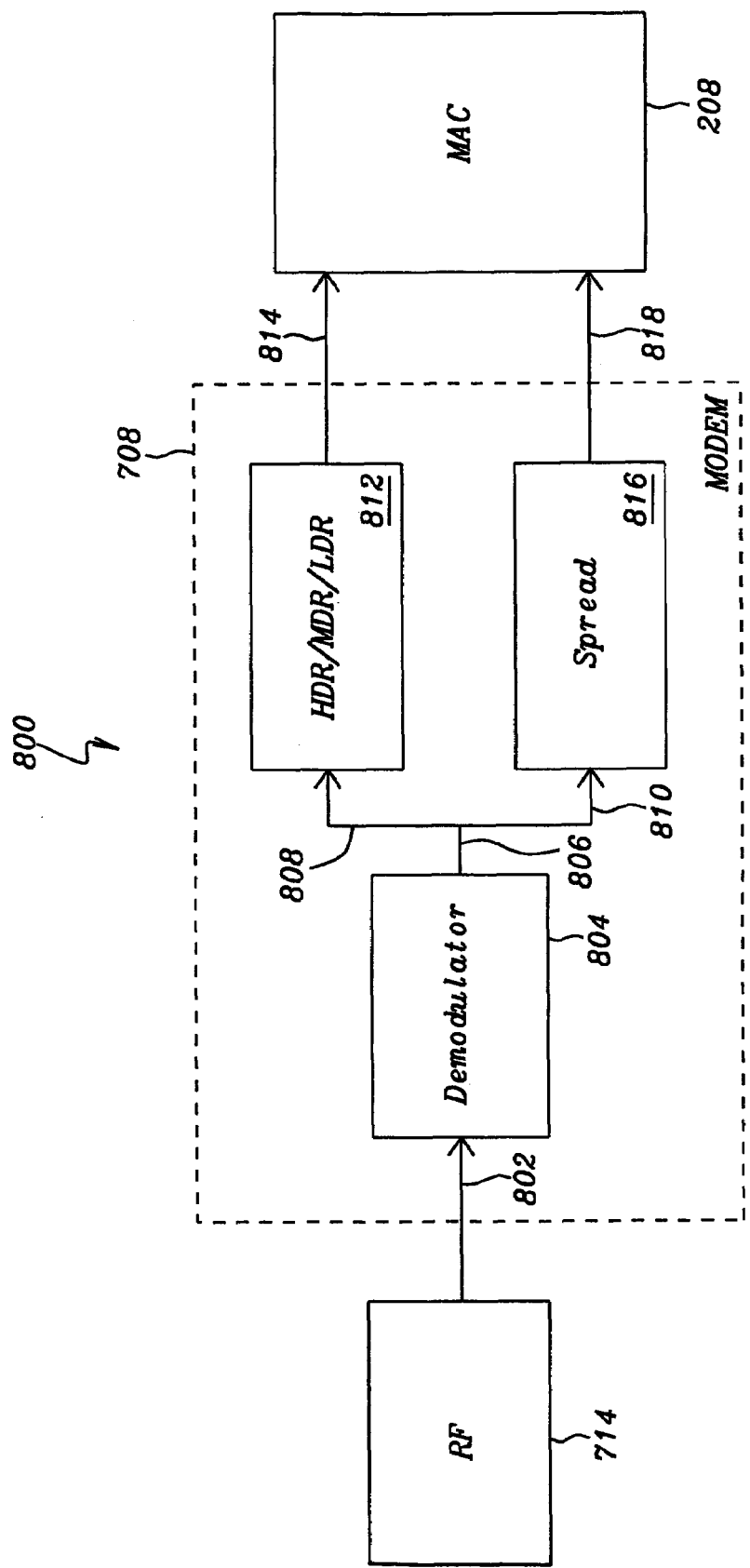
FIG. 8 illustrates an eighth preferred embodiment of the present invention showing a block diagram of a receiver chain of the physical layer of a wireless transceiver system.

Referring now to FIG. 8, an eighth preferred embodiment of the present invention is illustrated. A block diagram is shown depicting an exemplary embodiment of receiver architecture 800 of the physical layer 204 of the wireless interface units 112, 114, 116 of FIGS. 3, 4, 5. As shown, the RF unit 714 is coupled to a demodulator 804, which is coupled to both a normal-mode detector 812 and a spread mode detector 816. The normal and spread mode detectors 812, 816 are configured in a parallel arrangement and are coupled to the MAC layer 208. As described further herein, the RF unit 714 receives and down-converts RF signals to an intermediate frequency (IF), which are converted to digital IF signals 802 that are output to the demodulator 804 of the modem 708. The demodulator 804 then decodes the digital IF signals 802 to generate decoded signals 806 that are forwarded to both the normal-mode detector 812 and the spread mode detector 816. In the present embodiment, the "normal" mode refers to HDR, MDR and/or LDR modes, i.e., modes of operation that do not involve spreading. If the signals are spread signals (i.e., spread by a PN sequence) the spread-mode detector 816 will regenerate the original encrypted bit stream 818, which is then relayed to the MAC layer 208 for decryption and further processing. If the received signals are not spread, then the normal mode detector 812 will regenerate the original encrypted bit stream and send it to the MAC layer 208. In this way, the receiver is able to receive and regenerate the original bit stream without knowing whether the original bit stream was sent in normal mode or spread mode, and the wireless interface unit 112, 114, 116 may change from normal to spread mode without requesting or informing the receiver of any desired or actual changes made.

Figure 9:
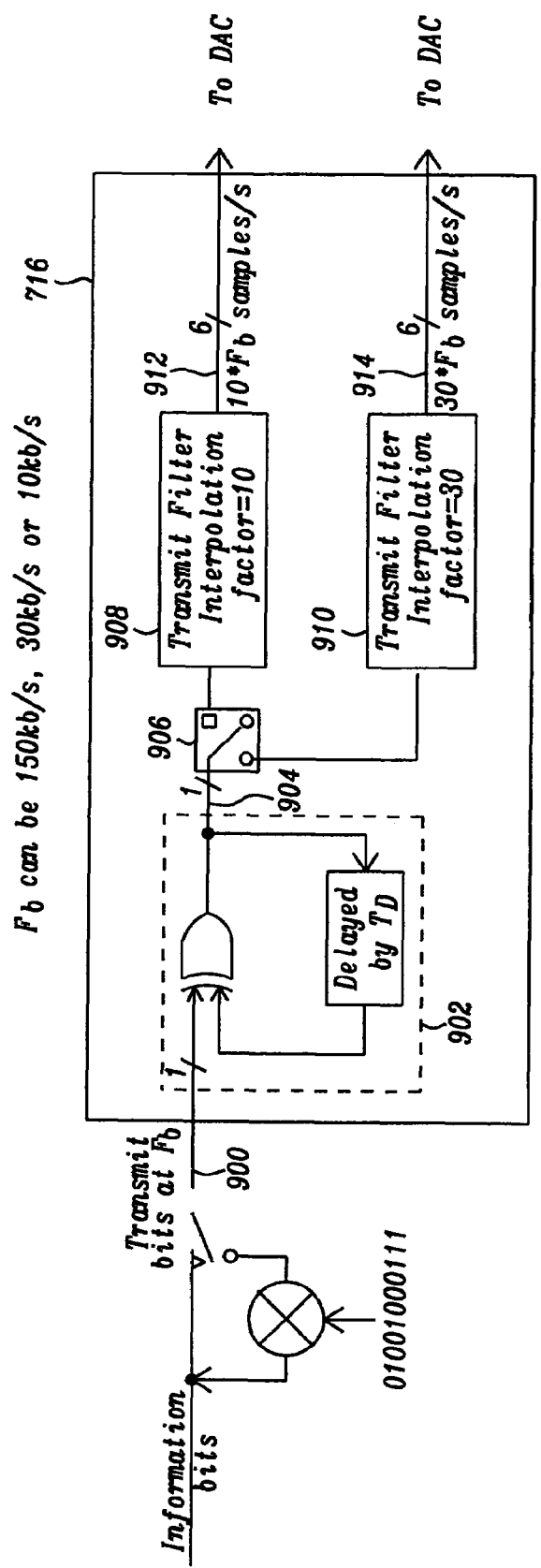
FIG. 9 illustrates a ninth preferred embodiment of the present invention showing a block diagram of a transmitter encoder of a wireless transceiver system.

Referring now to FIG. 9, a ninth preferred embodiment of the present invention is illustrated. A block diagram depicting one embodiment of the modem transmit encoder 716 is shown. Shown within the encoder 716 is a differential binary phase shift (BPSK) encoder 902 positioned to receive a bit stream 900 (either spread or non-spread). The output of the differential BPSK encoder 902 is coupled via a switch 906 to either an HDR/spread filter 908 or an MDR/LDR transmit filter 910. In the exemplary embodiment, the HDR/spread filter 908 has an interpolation factor of 10 and the MDR/LDR filter 910 has an interpolation factor of 30. In operation, the differential BPSK encoder 902 receives and differentially encodes the bit stream 900 so as to generate an encoded bit stream 904. The switch 906 then switches the encoded bit stream 904 to the HDR/spread filter 908 if the wireless interface unit 112, 114, 116 is in HDR or spread mode, or switches the encoded stream 904 to the MDR/LDR filter 910 if the wireless interface unit 112, 114, 116 is in MDR or LDR mode. When in spread or HDR mode, the HDR/spread filter 908 interpolates the encoded stream 904 by a factor of 10 and then filters out image energy. When the transceiver is in MDR/LDR mode, the MDR/LDR filter 910 interpolates the encoded stream 904 by a factor of 30 and then filters out image energy. After interpolation and filtering, the encoded and filtered bit stream 912, 914 is forwarded to the RF unit 714 as a 6-bit stream.

Figure 10:
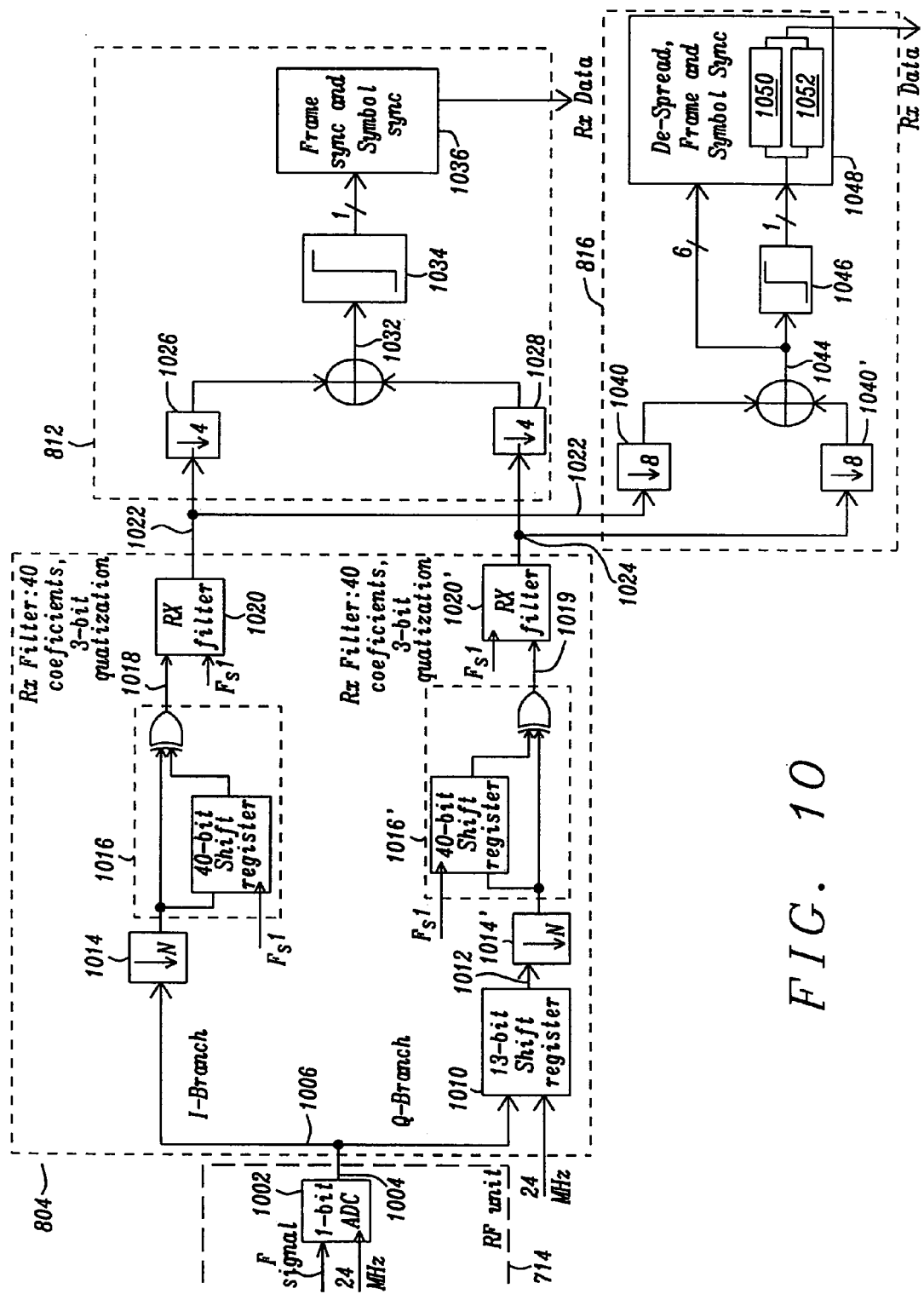
FIG. 10 illustrates a tenth preferred embodiment of the present invention showing a block diagram of a receiver demodulator of a wireless transceiver system.

Referring now to FIG. 10, a tenth preferred embodiment of the present invention is illustrated. A block diagram is shown depicting exemplary embodiments of the modem receive demodulator 804, normal-mode detector 812 and spread-mode detector 816. As shown, the demodulator 804 in the present embodiment receives a digital bit stream 1004 from a slicer 1002 (described further herein) and sends the bit stream 1004 along an in-phase branch (I-branch) and a quadrature branch (Q-branch). As shown, the I-branch receives the original slicer output 1004, and the Q-branch is formed by delaying the original slicer output 1004 with a 13-bit shift register 1010 by $T_{IF}/4$, where $T_{IF}=1/f_{IF}$, and in one embodiment, $f_{IF}$ is equal to 450 kHz. As shown, the I-branch 1006 and the Q-branch 1012 signals are then down converted by an I-branch and a Q-branch down converters 1014, 1014' respectively by an injection signal of (24/N) MHz wherein N is a clock division factor. The following is a table of the values for N in the exemplary embodiment:

TABLE 1

N-Values for clock division factor in down converter.

| Data Rate (kb/s) | N |
|---|---|
| 150 (HDR/Spread) | 4 |
| 30 (MDR) | 20 |
| 10 (LDR) | 60 |

Referring again to FIG. 10, the down-converted signals from the I-branch and a Q-branch down converters 1014, 1014' are then decoded by the I-branch and Q-branch differential BPSK decoders 1016, 1016' to generate I-branch and Q-branch decoded signals 1018, 1019. The I and Q-branch decoded signals 1018, 1019 are then filtered by matched I and Q-branch filters 1020, 1020' to remove image and out of band noise. In the exemplary embodiment, to search for normal and spread mode packets simultaneously, the I-branch and Q-branch filtered and decoded signals 1022, 1024 are sent to both the normal-mode detector 812 and the spread-mode detector 816. As shown, the I and Q branch filtered and decoded signals 1022, 1024 that are received by the normal-mode detector 812 are each down-converted at down converters 1026, 1028 by dividing the (24/N) MHz clock by 4, and then combined to generate a combined signal 1032. The combined signal 1032 is then detected by a zero cross detector 1034 before being synchronized at the symbol and frame level by the frame and symbol synchronization portion 1036. The I and Q branch filtered and decoded signals 1022, 1024 that are received by the spread-mode detector 816 are each down-converted at down converters 1040, 1040' by dividing the (24/N) MHz clock by 8, and then combined to generate a combined signal 1044. The combined signal 1044 is then detected by a zero cross detector 1046 before being de-spread and synchronized at the symbol and frame level by the frame and symbol synchronization portion 1048.

The combined signal 1044 is also fed to the frame and symbol synchronization portion 1048 to provide additional information, which assists frame synchronization. The frame and symbol synchronization portion 1048 in the in spread-mode detector 816, includes parallel first and second header detection modules 1050, 1052 that are configured to detect the header of a received frame. The second header detector 1052 operates in the same way as the first header detector 1050 except the second header detector 1052 delays the frame by the length of the header so that if the first header detector 1050 falsely triggers on what appears to a header, the second header detector 1052 continues to look for an actual header. In this way, fewer packets are likely to be missed by the spread-mode detector 816, and consequently, a fewer number of bits may be allocated to header-CRC protection than would typically be required without parallel detection (e.g., an 8-bit header CRC may be used instead of a 16-bit header CRC). In the present embodiment, only the spread mode detector 816 includes parallel header detection because the spread packets, which the spread mode detector 814 processes, are significantly longer, and hence, more prone to being missed during detection than the shorter packets detected by the normal mode detector 812.

Figure 12:
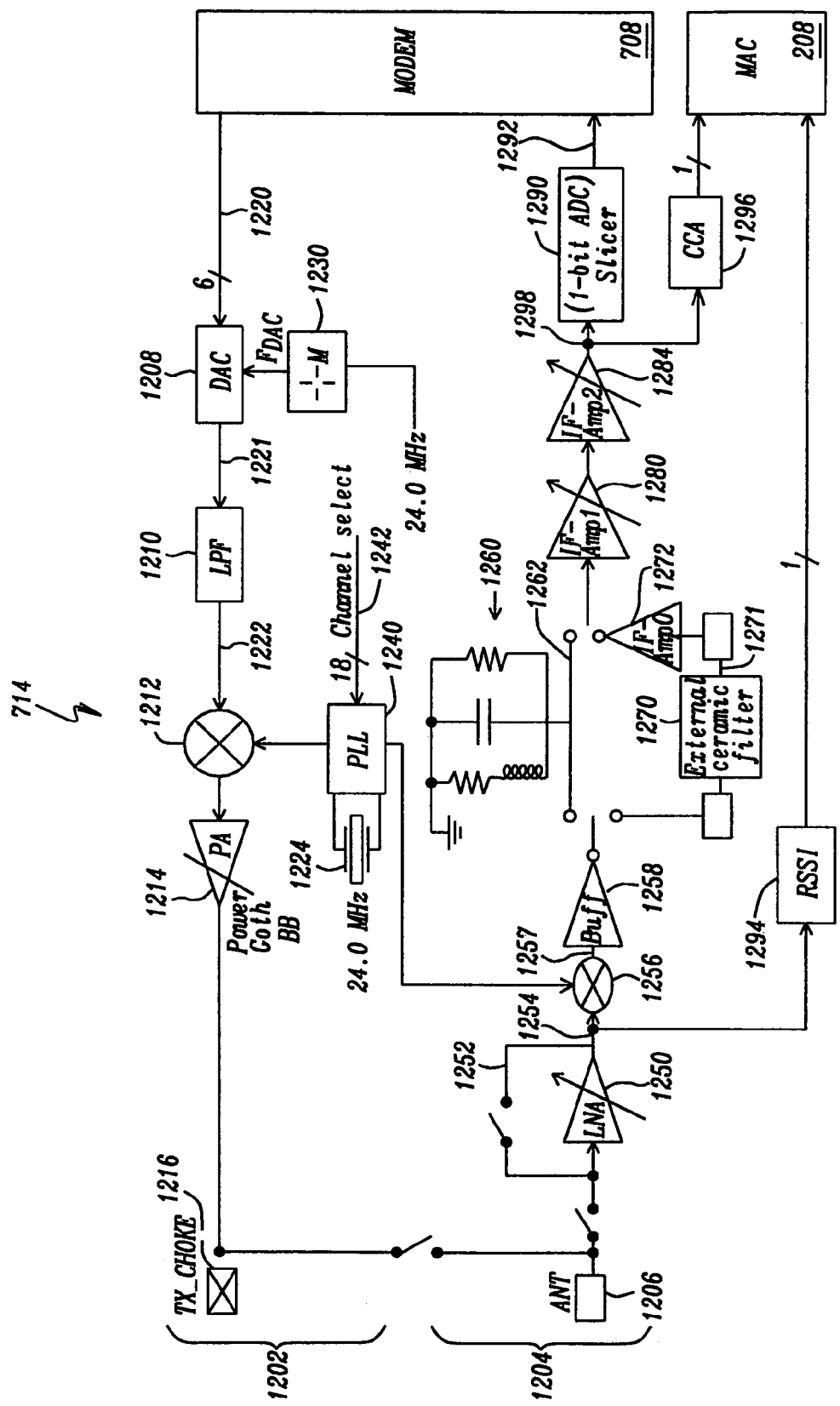
FIG. 12 illustrates a twelfth preferred embodiment of the present invention showing a block diagram of an RF unit of a wireless transceiver system.

Referring now to FIG. 12, a twelfth preferred embodiment of the present invention is illustrated. A block diagram is shown depicting an exemplary embodiment of the RF unit 714. The preferred embodiment RF unit 714 includes a transmitter chain 1202 and a receiver chain 1204, which share an antenna 1206. Within the transmitter chain 1202 are a digital to analog converter (DAC) 1208, a low pass filter (LPF) 1210, a modulator 1212, a power amplifier 1214, a transmitter choke 1216 and the antenna 1206. In operation, the DAC 1208 receives a BPSK bit stream 1220 from the modem 708 and converts it to an analog signal 1221 that is received and filtered by the low pass filter 1210 so as to generate a filtered signal 1222, which is then up-converted by the modulator 1212.

To counteract DC components in the filtered signal 1222 generated by leakage of the local oscillator (LO) 1224, a DC offset is added to the filtered signal 1222 at the modulator 1212. The DC offset is calibrated periodically (e.g., whenever the transceiver is powered on and/or after transmission of a predetermined number of packets), to maintain an effective offset level. After the filtered signal 1222 is up-converted, it is then amplified by the power amplifier 1214 and fed to the choke 1216 before being transmitted by the antenna 1206.

As shown, in the present embodiment, a clock generator 1230 receives the 24 MHz signal from the local oscillator 1224 and generates a clock for the DAC 1208 as a function of the number of bits per second that are converted to an analog signal 1221. Specifically, the clock signal generated for the DAC is (24/M) MHz where M is determined by the bit rate as shown in the following table:

TABLE 2

M-Values for DAC synchronization.

| Data Rate (kb/s) | M |
|---|---|
| 150 (HDR/Spread) | 16 |
| 30 (MDR) | 80 |
| 10 (LDR) | 80 |

Referring again to FIG. 12, in the exemplary embodiment, the local oscillator 1224 also provides a 24 MHz signal to a PLL 1240, which provides selectable frequencies for the modulator 1212. As discussed further herein, the PLL 1224 is driven by a channel select line 1242 (e.g., an 18 bit select line) to select the carrier frequency depending upon the transmission mode (i.e., HDR, MDR, spread and LDR modes), and when operating in the MDR mode, the PLL 1224 provides the injection signal for the specific channel.

Figure 13:
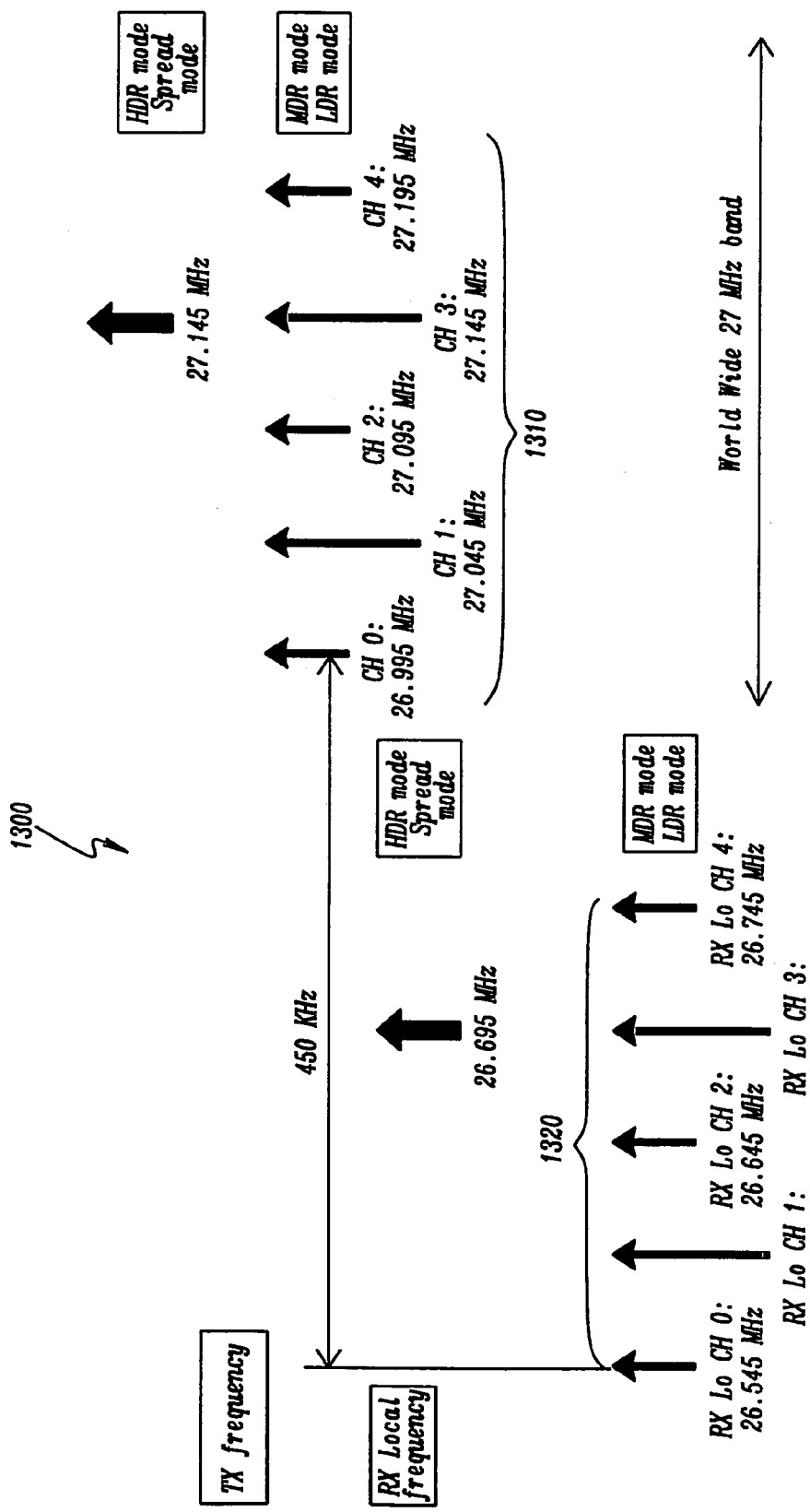
FIG. 13 illustrates a thirteenth preferred embodiment of the present invention showing a graph illustrating transmission frequencies for various modes of a wireless transceiver system.

Referring now to FIG. 13, a thirteenth preferred embodiment of the present invention is illustrated. A graph shows transmission frequencies 1300 for the RF unit 714 according to the exemplary embodiment. In HDR and spread mode, a transmission frequency of 27.145 MHz is utilized, and in MDR and LDR modes, the following five channelization frequencies 1310 are utilized: 26.995 MHz (CH 0), 27.045 MHz (CH 1), 27.095 MHz (CH 2), 27.145 MHz (CH 3) and 27.195 MHz (CH 4). This range of transmission modes and channels enables the RF unit 714 to operate in HDR mode as a default, and switch to either a spread mode (e.g., when a packet error rate of received signals increases above a threshold) or switch to MDR mode to avoid a narrow-band interference signal. Once in MDR, for example, a narrow-band interference may be avoided by frequency hopping among the five channels 1310 until the interference is avoided. Details of the logic controlling the switching between operating modes according to one embodiment, are found the above-referenced provisional application, Ser. No. 60/553,820.

Referring again to FIG. 12, within the receiving chain are a cascade of the following blocks: a low noise amplifier (LNA) 1250 with bypass path 1252, a mixer 1256, a buffer 1258, an HDR/spread filter 1260 and MDR/LDR bandpass filter 1270, a first and second IF amplifiers 1280, 1284 and a slicer 1290. In the exemplary embodiment, when operating in HDR or spread mode, signals received at the antenna 1206 are switched to and amplified by the LNA 1250 before being down-converted to an intermediate frequency (IF)(e.g., 450 KHz) by the mixer 1256. Referring briefly to FIG. 13, the local frequency provided to the mixer 1256 by the PLL 1212 during HDR and spread modes is 26.695 MHz. The intermediate frequency (IF) signals 1257 generated by the mixer 1256 are then passed through the buffer 1258 before being filtered by the HDR/spread bandpass filter 1260, which is switchably connected to an output of the buffer 1258. In the exemplary embodiment, the center frequency ($f_o$) of the HDR/spread bandpass filter 1260 is designed to be 450 KHz. The filtered IF signal 1262 is then amplified by the first and second IF amplifiers 1280, 1284, and the amplified IF signal 1288 is then converted from analog to digital by the slicer 1290.

In the exemplary embodiment, when operating in MDR, the received signals are switched around the LNA 1250 to the bypass path 1252 because a strong narrow band interfering signal (e.g., a citizens band (CB) radio signal) would potentially damage components of the receiver chain 1204 if further amplified. Referring briefly again to FIG. 13, shown are the following five local mixer frequencies 1320 generated by the PLL 1240 that correspond to the five transmission frequencies set forth above: 26.545 MHz (CH 0), 26.595 MHz (CH 1), 26.645 MHz (CH 2), 26.695 MHz (CH 3) and 26.745 MHz (CH 4). These five local frequencies 1320 may also be used during LDR mode. After the received MDR signals are down-converted by the mixer 1256 to an intermediate frequency (IF), and passed through the buffer 1258, they are switched to the ceramic BPF filter 1270. Although the ceramic BPF filter 1270 is not absolutely necessary, it provides very narrow band filtering for robust interference avoidance against strong interference sources such as CB radio.

To compensate for the absence of low noise amplification, the IF $Amp_0$ 1272 amplifies the filtered IF MDR signal 1271 before it is further amplified by IF $Amp_1$ 1280 and IF $Amp_2$ 1284. The amplified IF MDR signals 1288 are then converted to digital IF signals 1292 by the slicer 1290. In one embodiment, the amplification of IF $AMP_1$ 1280 varies dynamically to provide increased gain (e.g., 22 dB) over the gain provided during HDR mode (e.g., 12 dB). In the exemplary embodiment, the slicer 1290 detects zero crossings of the signal and generates a 1-bit digital output 1292 that is provided to the modem 708 for demodulation, decoding and detection. Although a conventional analog to digital converter may be implemented in place of the slicer 1290 to perform analog to digital conversion, carrying out conversion with a slicer 1290 reduces implementation costs by avoiding the need to employ an automatic gain control (AGC) loop.

Because the output 1292 of the slicer 1290 is dependent upon the zero crossings of the analog signal 1288 it receives, any noise component present in the analog signal 1288 substantially affects the noise generated by the slicer 1290. To prevent noise from adversely affecting the slicer 1290 output, a DC offset is added to the received signal at the input of the slicer 1290. In the present embodiment, the magnitude of the DC offset is calibrated, when there is no received signal present, by adjusting the DC offset to a level where the output of the slicer 1290 appears to be random noise. In one embodiment, binary search methodology is employed in the MAC layer 208 during calibration to arrive at the DC offset that produces random noise at the output of the slicer 1290. As shown, the receiver chain of the exemplary RF unit 714 includes an RSSI module 1294 coupled to the receiver chain 1204 just before the mixer 1256 (i.e., at the output of the LNA and MDR bypass path 1254) to detect the presence of strong signals (e.g., CB radio signals) by comparing the signal level just before the mixer 1254 to a fixed threshold. In this way, if a strong interfering signal is detected, the wireless interface unit 112, 114, 116 may switch from HDR mode to MDR mode. In addition, a clear channel assessment (CCA) module 1296 is coupled to the receiver chain 1204 to sample the IF signals 1288 at the input to the slicer 1290. In the exemplary embodiment, the CCA module 1296 reports a single bit to the MAC layer 208 to indicate whether the channel is busy (e.g., CCA output=1) or whether the channel is clear (e.g., CCA output=0). In the exemplary embodiment, the CCA module 1296 is configurable to change its threshold level depending upon the distance between the host transceiver 112 and device transceiver 114, 116 and the distance between an interfering signal and the wireless interface unit 112, 114, 116. In operation, the CCA module 1296 compares the measured signal level at the input to the slicer 1290 with the dynamically established threshold, and sends a "0" bit to the MAC layer 208 if the measured signal level is below the threshold, and a "1" bit to the MAC layer 208 if the measured signal is below the threshold.

Although the wireless interface units 112, 114, 116 described with reference to FIGS. 1-13 are described as having four operating modes (i.e., the HDR, MDR, LDR and spread modes), it should be recognized that other implementations with various subsets of the four operating modes are contemplated and well within the scope of the present invention. For example, chip sets destined only for the United States may only support HDR, MDR and spread modes, while chip sets destined for Europe may only support LDR mode. It should also be recognized that the data rates corresponding to each operating mode are merely exemplary and that other data rates may be used without departing from the scope of the present invention.

Figure 14:
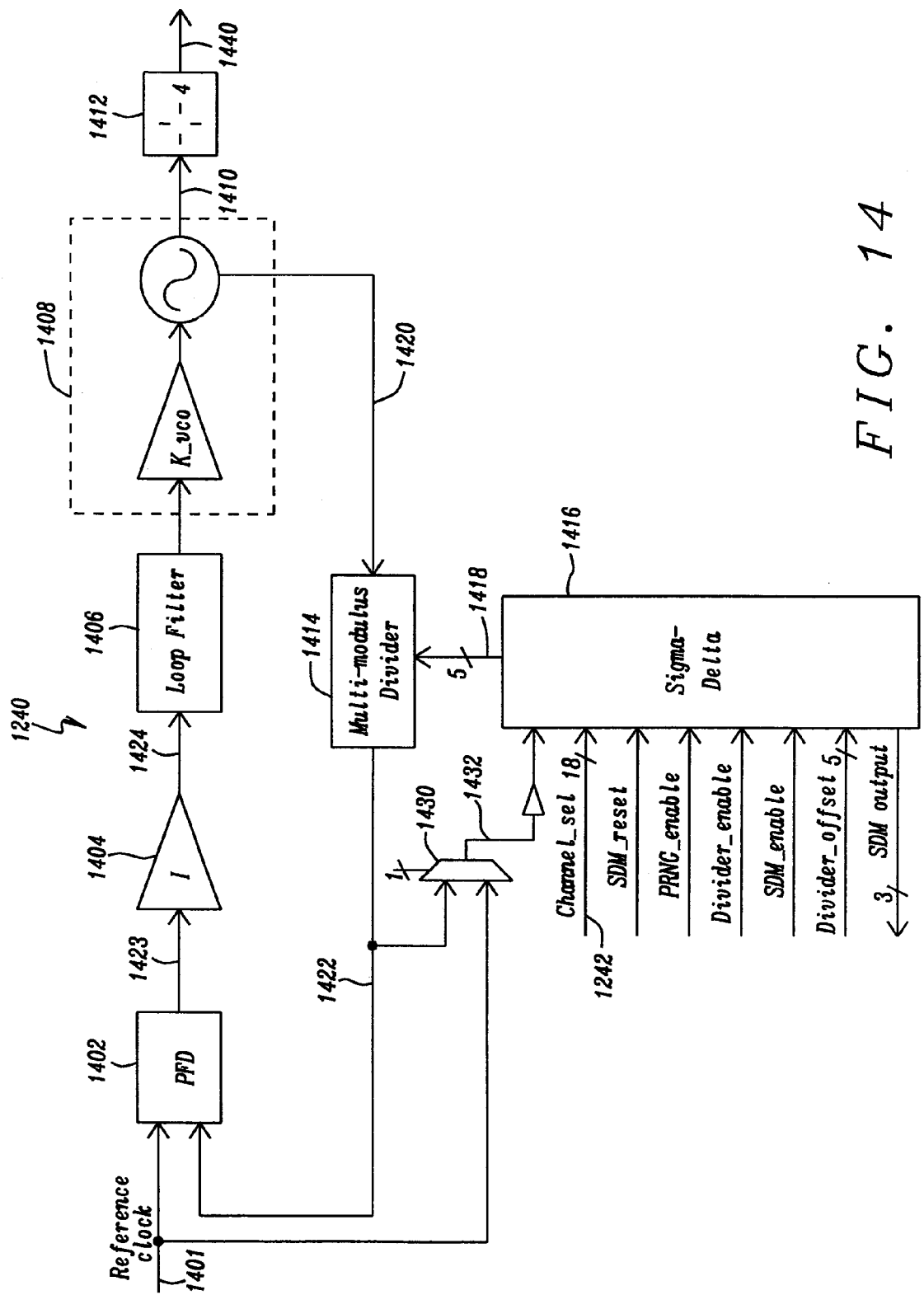
FIG. 14 illustrates a fourteenth preferred embodiment of the present invention showing a phase-locked loop of a wireless transceiver system.

Referring now to FIG. 14, a fourteenth preferred embodiment of the present invention is illustrated. A block diagram is shown illustrating one embodiment of a phase-locked loop 1240. As shown, a phase frequency detector (PFD) 1402 is coupled to and receives a reference clock signal 1401 derived from the local oscillator 1224. An output 1423 of the PFD 1402 is coupled to a charge pump 1404, which is also coupled to a loop filter 1406. A voltage-controlled oscillator (VCO)

1408 is disposed between the loop filter 1406 and a programmable divider 1414, which is coupled to a second input of the PFD 1402. The programmable divider 1414 is also coupled to a sigma-delta modulator 1416, which is disposed to receive a channel select signal from the MAC layer 208 via the channel select line 1242. The signal-delta modulator 1416 in the present embodiment includes several other inputs that are useable for diagnostic purposes or for enabling and disabling the sigma-delta modulator 1416. For example, the sigma-delta modulator 1416 is configured to receive a test signal from a MUX 1430, which is either the reference clock 1401 or a comparison frequency 1422 from the programmable divider 1414. As shown, an output 1410 of the VCO 1408 is coupled to a divide-by-four module 1412, which provides an output 1440, which is injected into the modulator 1212 and mixer 1256 as described above with reference to FIG. 12.

Referring again to FIG. 14, in operation, the PLL 1240 operates to generate an output 1440 that varies with respect to frequency depending upon the operating mode of the wireless interface units 112, 114, 116. Specifically, the MAC layer 208 provides a frequency select signal, via the channel select line 1242, to the sigma-delta modulator 1416, and the sigma-delta modulator 1416 provides a modulus control signal 1418 to the programmable divider 1414, which receives and varies the frequency of the feedback signal 1420 from the VCO 1408 so as to provide a comparison frequency 1422 to the PFD 1402.

As is known in the art, the PFD 1402 provides an error signal 1423 indicative of the difference in frequency between the reference clock 1401 and the comparison frequency 1422 to the charge pump 1404, which provides a control voltage 1424 proportional to the error signal. The control voltage signal 1424 is the filtered by the loop filter 1406 and provided to the VCO, which generates an output 1410, which varies with respect to frequency as a function of the control voltage 1424. To reduce spurs and phase noise, the VCO 1408 in the present embodiment, generates an output frequency 1410 that is four times greater than the desired output frequency. As a consequence, the divide-by-four module 1412 is implemented to generate an output 1440 with the desired frequency.

Figure 15:
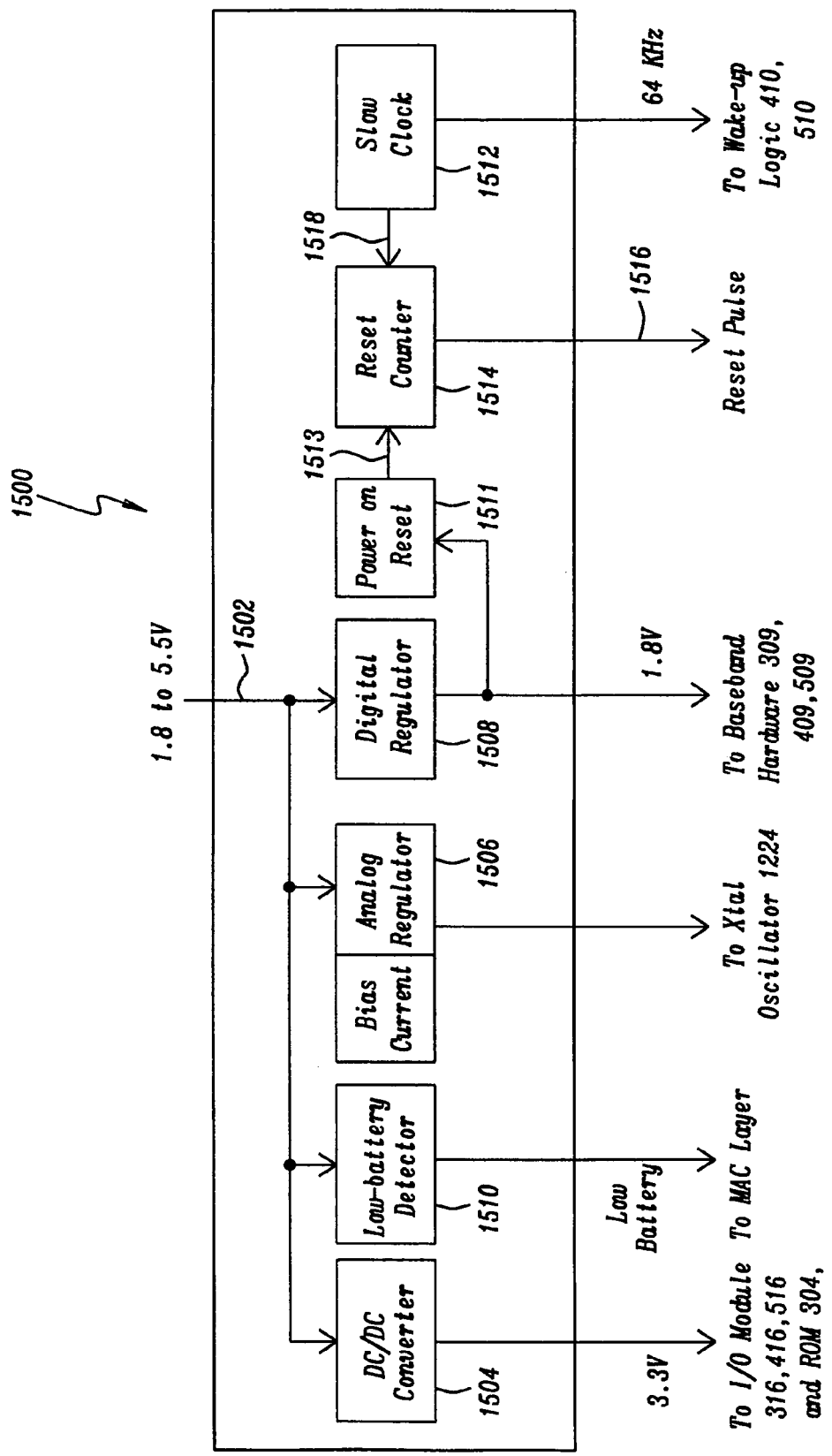
FIG. 15 illustrates a fifteenth preferred embodiment of the present invention showing a block diagram of a power interface of a wireless transceiver system.

Referring now to FIG. 15, a fifteenth preferred embodiment of the present invention is illustrated. A block diagram is shown of a power interface 1500, which is exemplary of the power interfaces 330, 430, 530 described with reference to FIGS. 3, 4 and 5 respectively. As shown in FIG. 15, the power interface 1500 receives power (e.g., 1.8 V to 5.5 V) via power line 1502, and the power line 1502 is coupled to a DC/DC converter 1504, an analog regulator 1506, a digital regulator 1508 and a low battery detector 1510. When the power interface 1500 is implemented within the host transceiver 112, the power line 1502 is typically coupled to a 4.5 to 5.5 Volt source within the PC 102, and when implemented in one of the wireless devices 114, 116, the power line is typically coupled to a 2.0 to 3.0 Volt battery source.

As shown, the DC/DC converter 1504 receives DC power from the power line 1502, and provides 3.3 VDC to the I/O module 316, 416, 516; ROM 304, 404, 504; optical sensor and LEDs. In the exemplary embodiment, the DC/DC converter 1504 is a switch-mode pulse width modulated converter that is configured to optimize efficiency by operating in a continuous mode (also referred to as a "voltage" mode) when load currents are relatively high (e.g., 40 mA), and a discontinuous mode (also referred to as a "burst" mode) when load currents are relatively low (e.g., 1 mA). One of ordinary skill in the art will appreciate that the efficiency of the DC/DC converter 1504 may be optimized by switching from voltage mode to burst mode as a function of both load current and input current. Preferably, the switching frequency of the DC/DC converter 1504 is established to avoid potentially detrimental harmonics, which result from the almost-square waveforms generated from the switching. Specifically, one or more a harmonics of the switching frequency may coincide with the carrier frequencies utilized by the wireless interface units 112, 114, 116, and hence, affect their ability to detect and decode signals. In one embodiment, for example, the switching frequency of the DC/DC converter 1504 is set to 2.8 MHz because the harmonics generated at this frequency generally fall outside the carrier frequencies for the HDR, spread and MDR modes described with reference to FIG. 13.

Referring again to FIG. 15, the analog regulator 1506 provides power to components of the wireless interface units 112, 114, 116 including the oscillator 1224. As described further herein, in sleep mode, the analog regulator 1506 deprives power to the oscillator 1224 to save a substantial amount of power. In addition, a digital regulator 1508 receives the power line 1502 voltage and provides 1.8 VDC to the baseband hardware 309, 409, 509 of the wireless interface units 112, 114, 116. As shown, a power on reset (POR) module 1511 is disposed to detect the output of the digital regulator 1508 and provide a POR reset signal 1513 to reset the power of wireless interface unit 112, 114, 116. Specifically, when the output voltage of the digital voltage regulator 1508 reaches a threshold voltage (e.g. 1.65 volts) when increasing from an off state to an on state, the POR module 1511 sends the POR signal 1513 to a reset counter 1514, which holds a reset signal 1516 low until the crystal oscillator 1224 is stable (e.g. for 120 mS). When the output voltage of the digital voltage regulator 1508 falls below a threshold voltage (e.g. 1.50 volts), the POR module 1511 holds the POR signal 1513 low, which causes the reset counter 1514 to hold the reset signal 1516 low until the POR 1511 raises the POR signal 1513 to a high level again.

As shown, a slow clock 1512 (e.g., 64 MHz) provides a clock signal 1518 to the reset counter 1514. As discussed further herein, the slow clock 1512 also drives the wake-up logic 310, 410, 510 during sleep mode. As shown, a low-battery detector 1510 in the power interface 1500 provides information about the state of the batteries to the MAC layer 208 so that the batteries may be replaced or recharged before powers levels render the wireless interface unit 112, 114, 116 inoperable. In one embodiment, the low battery detector 1510 provides an output indicative of four voltage threshold levels: 2.0V, 2.2V, 2.4V and 2.6V.

Figure 16:
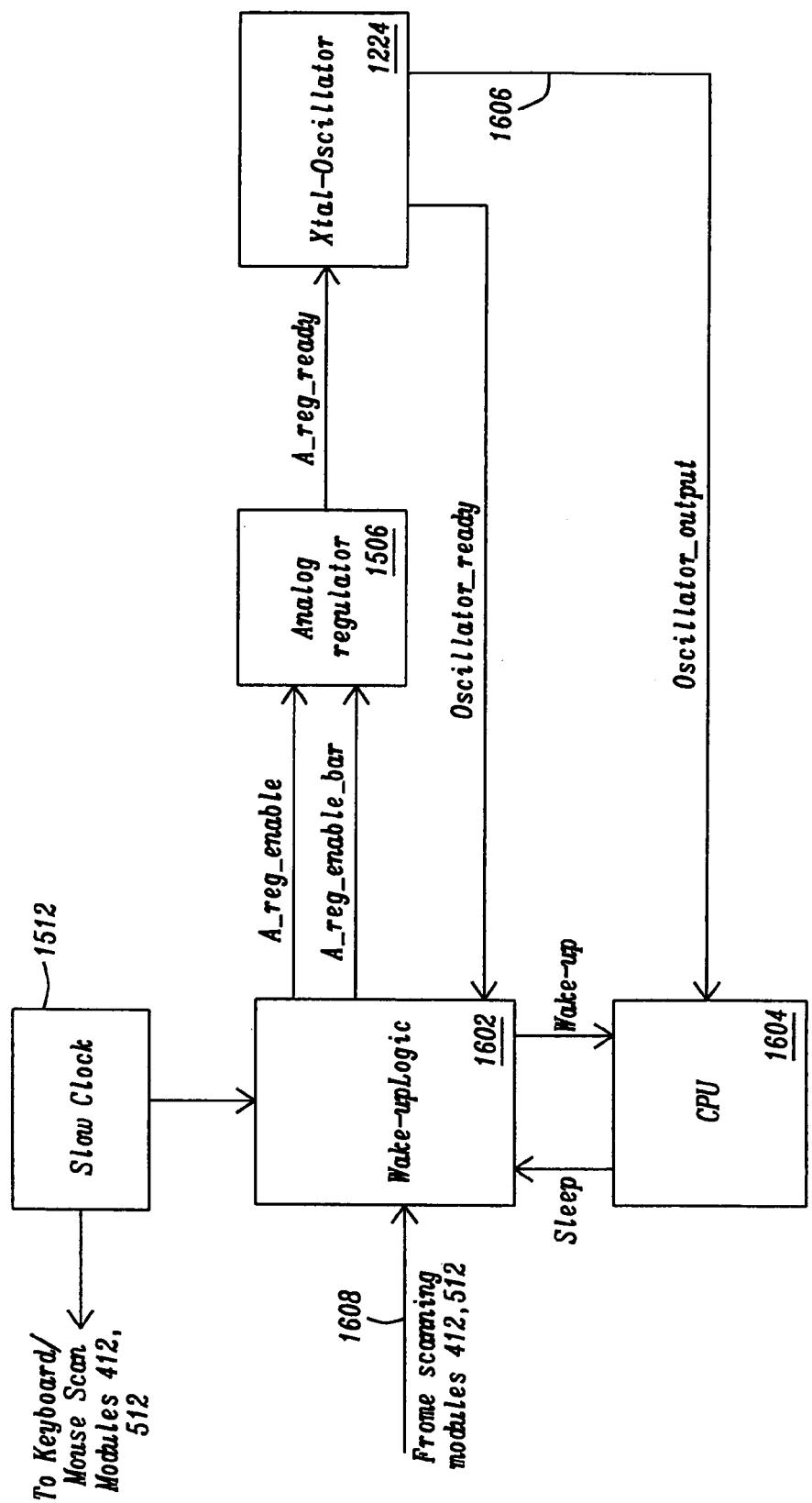
FIG. 16 illustrates a sixteenth preferred embodiment of the present invention showing a block diagram of functional components utilized to enter and exit the sleep mode of a wireless transceiver system.

Referring now to FIG. 16, a sixteenth preferred embodiment of the present invention is illustrated. A block diagram is shown depicting functional components utilized to enter and exit the sleep mode. As shown, wake-up logic 1602 (exemplary of wake-up logic 310, 410, 510) is coupled to a CPU 1604 (exemplary of CPU 302, 402, 502) via a sleep line and a wake_up line, and to the analog regulator 1506 via an A_reg_enable line and an a_reg_enable_bar line. The oscillator 1224 is coupled to the analog regulator 1506 via an A_reg_ready line and to the wake-up logic via an oscillator_ready line. In addition, an output 1606 of the oscillator 1606 is coupled to the CPU 1604. As shown, the wake-up logic 1602 is coupled to device scan modules 412, 512 via input line 1608.

Figure 17:
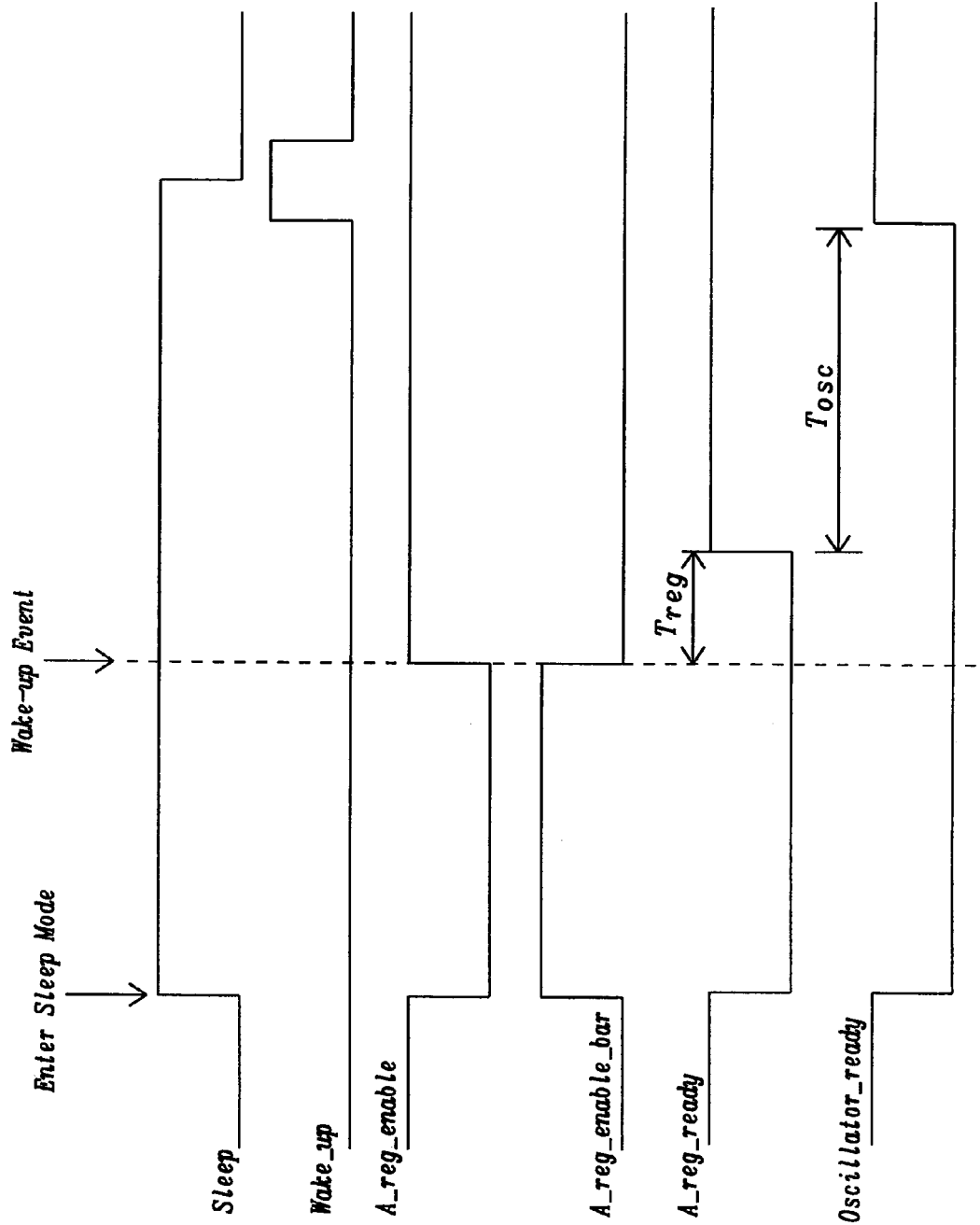
FIG. 17 illustrates a seventeenth preferred embodiment of the present invention showing a timing sequence diagram for sleep mode functionality of a wireless transceiver system.

Referring now to FIG. 17, a seventeenth preferred embodiment of the present invention is illustrated. A timing sequence diagram depicting the timing of signals among the functional components of the power moding is shown. While referring to FIG. 17, simultaneous reference will be made back to FIG. 16. When entering sleep mode (e.g., in response to a period of inactivity) the CPU 1604 raises the sleep line high, and in response, the wake-up logic 1602 pulls the A_reg_enable line low and the A_reg_enable_bar line high. In response, the analog regulator 1506 shuts down the oscillator 1224 by pulling the A_reg_ready line low, and in turn, the oscillator 1224 pulls the oscillator_ready line low. At this time, the oscillator 1224 is turned off and no longer provides clock signals to the CPU 1604 (among other components), and as a consequence, the wireless interface unit 112, 114, 116 consumes much less power. During sleep mode, the slow clock 1512 provides clock signals to the keyboard scan module 412, the mouse scan module 512 and the wake-up logic 1602. The DC/DC converter 1504 in this embodiment, is not affected by sleep mode, and continues to provide power to the I/O module 316, 416, 516 so that the keyboard and mouse scan modules 412, 512 may detect a key press or quadrature information from the keyboard 104 and mouse 106.

When there is a wake-up event (e.g., an interrupt signal from the scanning modules 412, 512 or expiration of a wake-up timer) the wake-up logic 1602 raises the A_reg_enable line high; thus prompting the analog regulator 1506 to ramp up to operating mode. After the analog regulator settles (i.e., after Treg seconds), the analog regulator 1506 raises the A_reg_ready line high, which triggers the oscillator to ramp up to operating mode. After the oscillator 1224 has settled (i.e., after Tosc seconds), the oscillator raises the oscillator_ready line high, which notifies the wake-up logic 1602 that the oscillator 1224 is ready for operation. As shown, the wake-up logic 1602, then raises the wake-up line high; thus waking up the CPU 1604, which pulls the sleep line low, and wake-up logic 1602 then pulls the wake-up line low. Additional details of exemplary logic that initiates the sleep signal from the CPU 1604 and the associated communications between the host transceiver 112 and the device transceivers 114, 116 may be found in the above-referenced provisional application, Ser. No. 60/553,820.

The advantages of the present invention may now be summarized. An effective and very manufacturable wireless transceiver system for computer input devices is achieved. A wireless interface device for use in a host computer or for use in an input device such as a keyboard or a mouse is achieved. The wireless interface device has built-in scanning and decoding functions for an input device such as a keyboard or a mouse. The wireless interface device has power saving functions to extend the battery life of the input device. The wireless interface device has the capability of automatically selecting between several communication frequencies or channels to improve communication reliability and to provide compatibility for various regulatory environments. The wireless interface device has the capability of automatically selecting between several data rates to improve reliability while not sacrificing speed of operation.

As shown in the preferred embodiments, the novel device of the present invention provides an effective and manufacturable alternative to the prior art.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

While the invention has been particularly shown and described with reference to the preferred embodiments thereof, it will be understood by those skilled in the art that various changes in form and details may be made without departing from the spirit and scope of the invention.

What is claimed is:

1. A baseband circuit device for a wireless input interface in a computer system, said circuit device comprising:
   a means to encrypt a data stream;
   a means to generate a cyclic redundancy code (CRC) for said data stream;
   a means to format an output data stream comprising a header, said encrypted data stream, and said cyclic redundancy code, wherein the header further comprises the data fields:
   i) a transmit sequence number;
   ii) a receive sequence number;
   iii) a data present indication;
   v) a payload length indicator;
   vi) a device indicator; and
   vii) a header CRC.

2. The device according to claim 1 wherein said means to encrypt comprises:
   an encryption key generator;
   a pseudo random number generator; and
   a means to OR said data stream with the product of said encryption key generator processed by said pseudo random number generator.

3. The device according to claim 1 further comprising a means to decrypt an encrypted data stream.

4. The device according to claim 1 wherein said means to decrypt comprises:
   an encryption key generator;
   a pseudo random number generator; and
   a means to OR said encrypted data stream with the product of said encryption key generator processed by said pseudo random number generator.

* * * * *